US011729734B2

(12) United States Patent
Hellwig et al.

(10) Patent No.: US 11,729,734 B2
(45) Date of Patent: Aug. 15, 2023

(54) APPARATUS AND METHOD FOR DETECTING GROUP DELAY INFORMATION AND APPARATUS AND METHOD FOR TRANSMITTING A MEASUREMENT SIGNAL VIA A TRANSMISSION MEDIUM

(71) Applicant: GiaX GmbH, Erlangen (DE)

(72) Inventors: Jörg Hellwig, Menden (DE); Andreas Blohmann, Lauf (DE); Holger Stadali, Erlangen (DE)

(73) Assignee: GIAX GMBH, Erlangen (DE)

( * ) Notice: Subject to any disclaimer, the term of this patent is extended or adjusted under 35 U.S.C. 154(b) by 111 days.

(21) Appl. No.: 17/123,504

(22) Filed: Dec. 16, 2020

(65) Prior Publication Data
US 2021/0195545 A1    Jun. 24, 2021

(30) Foreign Application Priority Data

Dec. 18, 2019   (DE) .......................... 102019220091.5

(51) Int. Cl.
*H04W 56/00*    (2009.01)
(52) U.S. Cl.
CPC ............................... *H04W 56/0045* (2013.01)
(58) Field of Classification Search
None
See application file for complete search history.

(56) References Cited

U.S. PATENT DOCUMENTS 3,573,611 A * 4/1971 Bergemann ............ H04B 3/462
324/76.35
3,970,926 A * 7/1976 Rigby .................... H04B 3/462
324/621
(Continued)

FOREIGN PATENT DOCUMENTS

CN          105515910 B  * 10/2018 ......... H04L 43/0852
DE          2436011 A1    12/1975
(Continued)

OTHER PUBLICATIONS

European Office Action, dated Apr. 23, 2021, in the parallel patent application No. 20214656.9.

*Primary Examiner* — Khaled M Kassim
*Assistant Examiner* — Berhanu D Belete
(74) *Attorney, Agent, or Firm* — McClure, Qualey & Rodack, LLP

(57) ABSTRACT

An apparatus for detecting group delay information over frequency for a transmission medium has: a receiver for receiving a measurement signal, the measurement signal comprising at least a first carrier signal at a first carrier frequency, a second carrier signal at a second carrier frequency and a third carrier signal at a third carrier frequency; a frequency analyzer for analyzing the reception signal to obtain reception phase information on the first carrier signal, the second carrier signal and the third carrier signal; and a processor for forming a first combined piece of phase information and for forming a second combined piece of phase information, for forming a first piece of group delay information and for forming a second piece of group delay information, and for associating the first piece of group delay information to a first frequency and the second piece of group delay information to a second frequency.

17 Claims, 16 Drawing Sheets

(56) References Cited

U.S. PATENT DOCUMENTS

| | | | | |
|---|---|---|---|---|
| 4,084,132 A * | 4/1978 | Fletcher | | G01R 27/28 |
| | | | | 324/621 |
| 4,245,320 A | 1/1981 | Desblache | | |
| 4,264,959 A | 4/1981 | Blaaess | | |
| 4,423,420 A * | 12/1983 | Krajewski | | G01S 3/58 |
| | | | | 342/400 |
| 6,360,078 B1 * | 3/2002 | Driedger | | H03J 7/02 |
| | | | | 455/226.1 |
| 7,032,150 B2 * | 4/2006 | Wu | | H04L 25/0202 |
| | | | | 324/763.01 |
| 7,075,659 B2 * | 7/2006 | Szafraniec | | G01M 11/331 |
| | | | | 356/73.1 |
| 7,526,701 B2 * | 4/2009 | Wu | | G01R 31/2882 |
| | | | | 714/742 |
| 8,983,796 B2 * | 3/2015 | Bednorz | | H04B 3/462 |
| | | | | 702/179 |
| 9,933,467 B1 * | 4/2018 | Stein | | G01R 23/02 |
| 10,454,600 B2 * | 10/2019 | Leibfritz | | H04B 17/364 |
| 10,650,800 B2 * | 5/2020 | Tamura | | G10L 13/047 |
| 10,891,869 B1 * | 1/2021 | McIntosh | | G08G 5/045 |
| 11,170,756 B2 * | 11/2021 | Tamura | | G10L 13/06 |
| 11,348,569 B2 * | 5/2022 | Tamura | | G10L 25/18 |
| 2005/0174577 A1 * | 8/2005 | Szafraniec | | G01M 11/333 |
| | | | | 356/477 |
| 2006/0159205 A1 * | 7/2006 | Wagner | | H04L 27/2659 |
| | | | | 375/E1.008 |
| 2008/0033730 A1 * | 2/2008 | Jot | | H03H 17/0266 |
| | | | | 704/E21.001 |
| 2011/0288820 A1 * | 11/2011 | Bednorz | | H04B 3/462 |
| | | | | 702/176 |
| 2012/0001783 A1 * | 1/2012 | Eklund | | H03M 1/0675 |
| | | | | 341/118 |
| 2014/0140449 A1 * | 5/2014 | Kusunoki | | H04L 27/2665 |
| | | | | 375/343 |
| 2015/0302845 A1 * | 10/2015 | Nakano | | G10L 25/15 |
| | | | | 704/267 |
| 2015/0365502 A1 * | 12/2015 | Uyehara | | H04B 7/024 |
| | | | | 455/561 |
| 2018/0174571 A1 * | 6/2018 | Tamura | | G10L 13/047 |
| 2018/0267154 A1 * | 9/2018 | Ootaka | | G01S 7/4912 |
| 2018/0267155 A1 * | 9/2018 | Shimizu | | G01S 7/4912 |
| 2018/0302179 A1 * | 10/2018 | Leibfritz | | G01R 27/32 |
| 2020/0234691 A1 * | 7/2020 | Tamura | | G10L 13/06 |
| 2020/0234692 A1 * | 7/2020 | Tamura | | G10L 13/047 |

FOREIGN PATENT DOCUMENTS

| | | | | |
|---|---|---|---|---|
| DE | 2845166 A1 | | 5/1979 | |
| EP | 1515147 A1 * | | 3/2005 | H03M 1/1085 |
| EP | 1515147 A1 | | 3/2005 | |
| EP | 2149996 B1 * | | 1/2011 | H04B 17/0085 |
| GB | 797909 A * | | 2/1956 | |
| WO | 2010081725 A2 | | 7/2010 | |

* cited by examiner

- Calculating the difference of successive symbols:

$$\text{phaseDiff}_{TX}[ii] = \text{phase}_{TX}[ii+1] - \text{phase}_{TX}[ii]$$

$$\text{phaseDiff}_{RX}[ii] = \text{phase}_{RX}[ii+1] - \text{phase}_{RX}[ii]$$

← 410

- Correcting the phase values phaseDiff$_{TX}$ and phaseDiff$_{RX}$ by $\pm 2\pi$, in case absolute hops greater than $\pi$ occur between successive phase values:

$$\text{phase}[jj] = \text{phase}[jj] \pm 2\pi$$
with phase = phaseDiff$_{TX}$ bzw. phase = phaseDiff$_{RX}$
and jj = ii+1, ..., (len$_{freq}$- 1), in case:
$$|\text{phase}[ii+1] - \text{phase}[ii]| > \pi$$
with ii = 1, ..., (len$_{freq}$- 2)

← 440 (optional)

- Subtracting the transmitted phase values from the received phase values:

$$\text{p1p2}[ii] = \text{phaseDiff}_{RX}[ii] - \text{phaseDiff}_{TX}[ii]$$

← 420

- Correcting the difference p1p2 by $\pm 2\pi$, in case absolute hops greater than $\pi$ occur between successive values:

$$\text{p1p2}[jj] = \text{p1p2}[jj] \pm 2\pi$$
with jj = ii+1, ..., (len$_{freq}$- 1), in case:
$$|\text{p1p2}[ii+1] - \text{p1p2}[ii]| > \pi$$
with ii = 1, ..., (len$_{freq}$- 2)

← 450 (optional)

- Calculating the group delay gd[ii] in nanoseconds:

$$gd[ii+1] = -\frac{\text{p1p2}[ii]}{2 \cdot pi \cdot \text{freq}_{step}} \cdot 1 \cdot 10^3$$

← 430 (optional)

with ii = 1, ..., (len$_{freq}$- 1) and
gd[1] = 0

Fig. 4 preferred value regions for certain parameters

- $SAMPLE_{FREQ}$ = 1000 MHz to 10000 MHz or 2000 to 5000 MHz
- $NUM_{SAMPLES}$ = 4000 to 12000
- $BW_{USE}$ = 50 to 500 MHZ
- $TX_{SPACING}$ = 1 to 30
- $OVERLAP_{MEASURE}$ = 2 to 20
- $NUM_{SNAPSHOTS}$ = 1 to 20
- $time_{start}$ = 2 to 20
- $time_{snapshot}$ = 0,5 to 5
- txlowfreq = 1500 to 3500
- txhighfreq = 3000 to 5000

Fig. 9a

| Loplan number | $lo_{freq}$ | iqinvert |
|---|---|---|
| 1 | 2700 | true |
| 2 | 3100 | true |
| 3 | 3400 | true |
| 4 | 3300 | false |
| 5 | 3600 | false |
| 6 | 3700 | false |

Fig. 9b

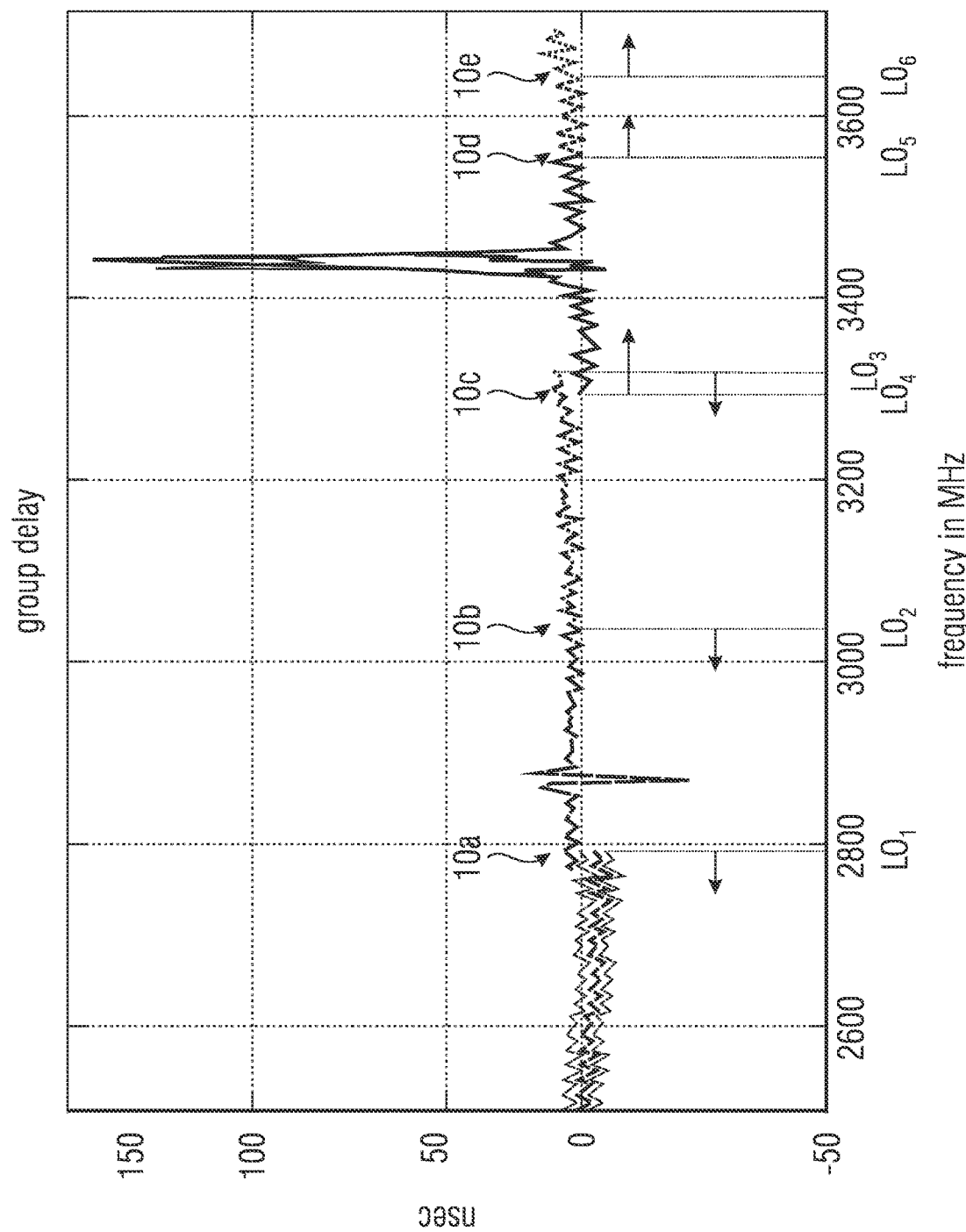

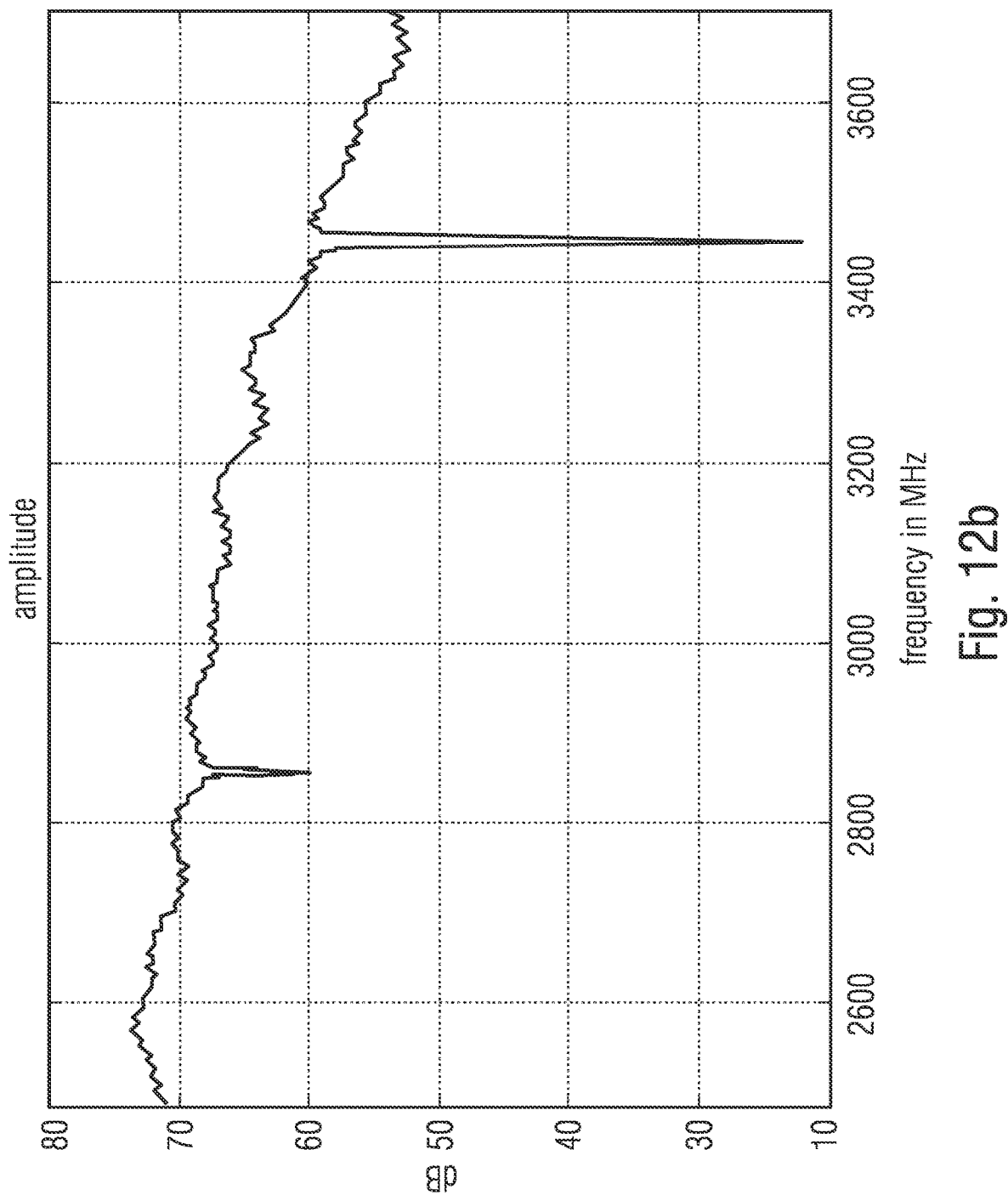

APPARATUS AND METHOD FOR
DETECTING GROUP DELAY INFORMATION
AND APPARATUS AND METHOD FOR
TRANSMITTING A MEASUREMENT
SIGNAL VIA A TRANSMISSION MEDIUM

CROSS-REFERENCE TO RELATED
APPLICATION

This application claims priority from German Patent Application No. 102019220091.5, which was filed on Dec. 18, 2019, and is incorporated herein by reference in its entirety.

BACKGROUND OF THE INVENTION

The present invention relates to measuring and characterizing a transmission medium, like a coaxial cable, for example, above its normal operating bandwidth.

The HelEOS system provided by the Giax GmbH Company comprises modem and switch technology which connects point-to-point Ethernet links via existing coaxial cables to form an Ethernet overlay system. This Ethernet overlay system provides for transmitting data on frequencies, which nowadays are not made use of, above the currently used frequencies, which are also referred to as "white spaces". These frequencies can be accessed by means of a diplexer which makes available the existing upstream and downstream frequencies for well-known systems, like DOCSIS and DVB-C, for example, and a new frequency range above 1 GHz, or 1.2 GHz DOCSIS 3.1, for example. The HelEOS system searches for the optimum frequency range for transmission and is able to adapt, during operation, to potential changes in the transmission route by adjusting the modulation used. Thus, a multiplication of the data rates available for fast Internet connections can be achieved without any great changes in the cable infrastructure and without providing fiber optic cables. The HelEOS system is able to convey up to 10 Gbits/s in downstream operation and 10 Gbits/s in upstream operation so that an overall sum rate of 25-30 Gbits/s can be achieved using a single coaxial cable, together with the data rates achievable in DOCSIS (in the lower frequencies).

In order to make use of the coaxial infrastructure range above the normal frequencies provided for the coaxial infrastructure, a precise characterization and measurement of the coaxial infrastructure are performed in order to then be able to drive the transmitter (and consequently also the receiver) correspondingly based on the obtained characterization of the coaxial infrastructure or, expressed generally, the transmission medium.

Typically, transmission parameters and, in particular, group delay information of a two-port are measured by a network analyzer. A network analyzer used for a two-port measurement entails synchronization between the transmitter and the receiver in order for precise phase information to be obtained. However, in the application described before, the synchronization cannot be compiled with easily since the measurements deal with line lengths in the range of up to several hundreds of meters. Thus, synchronization between transmitter and receiver over such a great distance can only be obtained with difficulties or high complexity, if at all, since the transmitter of a signal and the receiver for this very signal transmitted and changed by the cable, will not be located at one and the same position.

WO 2010/081725 A2 discloses a method for measuring a group delay caused by a measurement object to be measured, using a network analyzer, comprising the following method steps: generating an excitation signal consisting of two signals spaced apart by a frequency difference in the network analyzer, exciting the measurement object by the excitation signal and measuring a response signal consisting of two signals which are each phase-distorted by the measurement object relative to the signals, by the network analyzer, determining a phase difference between the signals belonging to the excitation signal and a phase difference between the signals belonging to be response signal, and calculating the group delay from the phase difference of the signals belonging to the excitation signal, the difference of the signals belonging to the response signal and the frequency spacing.

DE 28 45 166 C3 discloses a method for increasing the characteristic curve of the group delay in a transmission channel and applying the same to the automatic selection of an equalizer. A measurement signal consisting of three oscillations having three frequencies is transmitted via the transmission channel and the instantaneous phase is derived from the components at the frequencies and, from this, the gradient of the characteristic curve of the group delay is calculated.

OE 24 36 011 C3 discloses a method and a circuit arrangement for measuring the group delay characteristic of a transmission route in which a test signal is fed to an input of the transmission route, the test signal containing a carrier which is switched periodically between a measuring frequency and a reference frequency and is amplitude-modulated with a frequency, in which the test signal is received at the output of the transmission route, in which a first time interval is measured from a point during a period of the one carrier frequency and a point during a period of the other carrier frequency, in which a second time interval is measured from a point during a period of the other carrier frequency and a point during a period of the one carrier frequency, and in which the difference between the two time intervals is determined and the group delay characteristic is derived from the difference, wherein specified points of the frequency curve are sampled during the reference frequency period and during the measuring frequency period in the signal received and wherein the first and second time intervals are measures digitally by an impulse counter for clock impulses.

SUMMARY

According to an embodiment, an apparatus for detecting group delay information over frequency for a transmission medium may have: a receiver for receiving a measurement signal to provide a reception signal, the measurement signal having at least a first carrier signal at a first carrier frequency, a second carrier signal at a second carrier frequency and a third carrier signal at a third carrier frequency, wherein transmission phase information on the carrier signals are known or derivable; a frequency analyzer for analyzing the reception signal to obtain reception phase information on the first carrier signal, the second carrier signal and the third carrier signal; and a processor for forming a first combined piece of phase information from the reception phase information from a first pair of carrier signals and for forming a second combined piece of phase information from the reception phase information from a second pair of carrier signals, the second pair of carrier signals differing from the first pair of carrier signals, for forming a first piece of group delay information from the first combined piece of phase information and the transmission phase information relating to the first pair of carrier signals and for forming a second piece of group delay information from the second combined piece of phase information and the transmission phase information relating to the second pair of carrier signals, and for associating the first piece of group delay information to a first frequency and the second piece of group delay information to a second frequency, the first frequency being derived from frequencies of the first pair of carrier signals, and the second frequency being derived from frequencies of the second pair of carrier signals.

According to another embodiment, an apparatus for transmitting a measurement signal via a transmission medium may have: a processor for generating a measurement signal, the measurement signal having at least a first carrier signal at a first earner frequency, a second carrier signal at a second carrier frequency and a third carrier signal at a third carrier frequency, wherein transmission phase information on the carrier signals are defined; and a transmitter for feeding the measurement signal to the transmission medium, wherein the processor is configured to generate the measurement signal as a cyclic signal, to store the cyclic measurement signal in a transmitter memory, and to transfer the cyclic measurement signal to a digital-to-analog converter successively for a defined number of times to obtain a base band signal having a sequence of analog versions of the measurement signal, and wherein the transmitter is configured to convert the base band signal to a transmission band using a local oscillator and feed the converted base band signal to the transmission medium.

According to another embodiment, a method for detecting group delay information over frequency for a transmission medium may have the steps of: receiving a measurement signal to provide a reception signal, the measurement signal having at least a first carrier signal at a first carrier frequency, a second carrier signal at a second carrier frequency and a third carrier signal at a third carrier frequency, wherein transmission phase information on the carrier signals are known or derivable; analyzing the reception signal to obtain reception phase information on the first carrier signal, the second carrier signal and the third carrier signal; forming a first combined piece of phase information from the reception phase information from a first pair of carrier signals and forming a second combined piece of phase information from the reception phase information from a second pair of carrier signals, the second pair of carrier signals differing from the first pair of carrier signals, forming a first piece of group delay information from the first combined piece of phase information and the transmission phase information relating to the first pair of carrier signals and forming a second piece of group delay information from the second combined piece of phase information and the transmission phase information relating to the second pair of carrier signals, and associating the first piece of group delay information to a first frequency and the second piece of group delay information to a second frequency, the first frequency being derived from frequencies of the first pair of carrier signals, and the second frequency being derived from frequencies of the second pair of carrier signals.

According to still another embodiment, a method for transmitting a measurement signal via a transmission medium may have the steps of: generating a measurement signal, the measurement signal having at least a first carrier signal at a first carrier frequency, a second carrier signal at a second carrier frequency and a third carrier signal at a third carrier frequency, wherein transmission phase information on the carrier signals are defined; and feeding the measurement signal to the transmission medium, wherein generating has generating the measurement signal as a cyclic signal, storing the cyclic measurement signal in a transmitter memory, and transferring the cyclic measurement signal to a digital-to-analog converter successively for a defined number of times to obtain a base band signal having a sequence of analog versions of the measurement signal, and wherein feeding has converting the base band signal to a transmission band using a local oscillator and feeding the converted base band signal to the transmission medium.

Another embodiment may have a non-transitory digital storage medium having stored thereon a computer program for performing a method for detecting group delay information over frequency for a transmission medium having the steps of: receiving a measurement signal to provide a reception signal, the measurement signal having at least a first carrier signal at a first carrier frequency, a second carrier signal at a second carrier frequency and a third carrier signal at a third carrier frequency, wherein transmission phase information on the carrier signals are known or derivable; analyzing the reception signal to obtain reception phase information on the first carrier signal, the second carrier signal and the third carrier signal; forming a first combined piece of phase information from the reception phase information from a first pair of carrier signals and forming a second combined piece of phase information from the reception phase information from a second pair of carrier signals, the second pair of carrier signals differing from the first pair of carrier signals, forming a first piece of group delay information from the first combined piece of phase information and the transmission phase information relating to the first pair of carrier signals and forming a second piece of group delay information from the second combined piece of phase information and the transmission phase information relating to the second pair of carrier signals, and associating the first piece of group delay information to a first frequency and the second piece of group delay information to a second frequency, the first frequency being derived from frequencies of the first pair of carrier signals, and the second frequency being derived from frequencies of the second pair of carrier signals, when said computer program is run by a computer.

Still another embodiment may have a non-transitory digital storage medium having stored thereon a computer program for performing a method for transmitting a measurement signal via a transmission medium having the steps of: generating a measurement signal, the measurement signal having at least a first carrier signal at a first carrier frequency, a second carrier signal at a second carrier frequency and a third carrier signal at a third carrier frequency, wherein transmission phase information on the carrier signals are defined; and feeding the measurement signal to the transmission medium, wherein generating has generating the measurement signal as a cyclic signal, storing the cyclic measurement signal in a transmitter memory, and transferring the cyclic measurement signal to a digital-to-analog converter successively for a defined number of times to obtain a base band signal having a sequence of analog versions of the measurement signal, and wherein feeding has converting the base band signal to a transmission band using a local oscillator and feeding the converted base band signal to the transmission medium, when said computer program is run by a computer.

The present invention is based on the finding that a measurement signal comprising at least three carrier signals at three different carrier frequencies, the measurement signal advantageously being a cyclic measurement signal, allows determining the group delay information by using a frequency analysis of the measurement signal on the receiver side and downstream processing of the phase information, arriving at the receiver, of the carrier signals beyond frequency limits.

In particular, a combined piece of phase information is formed by a processor from the reception phase information from at least two carrier signals in order to then determine the group delay information from the combined phase information and the transmission phase information, which are known or can be transferred from the transmitter to the receiver, for example via a second channel. Since, however, the transmission phase information can be selected as desired and, advantageously, are set to +/−90 degrees for a carrier and 0/180 degrees for the carrier adjacent in terms of frequency, the transmission phase information can be estimated by the receiver on the basis of the received carrier signals, in particular when not only three carrier signals are used in one "pass", but when a larger number of carrier signals, like 20 to 100 carrier signals, for example, is used per pass.

An advantageously cyclic measurement signal having a number of carrier signals which at least equals three and the number of which is limited in an upward direction only by the transmitter/receiver elements used and is 100, for example, is generated on the transmitter side. This typically digitally generated signal in which phases of carrier signals adjacent in frequency are to be spaced apart from one another advantageously by 90 degrees, may be generated digitally and stored in a transmitter memory. Subsequently, this signal is reproduced in a "continuous loop" and converted by a local oscillator from the baseband to the band to be characterized and fed to the transmission medium, like a coaxial infrastructure, for example.

On the receiver side, the transmission band to be characterized is downmixed to the baseband by a local oscillator and, after an analog-to-digital conversion, stored in a receiver memory. The stored signal is then subjected to frequency analysis to determine the phase values of the carrier signals on the receiver side. Thus, no synchronization between transmitter and receiver is required. Instead, the group delay determination over frequency is performed by forming a combined piece of phase information of the reception phase information from two neighboring carrier signals, then formed from the combined piece of phase information and transmission phase information transmitted via a second channel and derived on the receiver side. The piece of group delay information is then associated to one of the carrier frequencies each.

When a piece of group delay information has been determined by evaluating the reception phase information of the first and the second carrier signal, the piece of group delay information can be associated to a frequency equaling the first carrier frequency or the second carrier frequency, or another carrier frequency between the first and second carrier frequencies, for example. Thus, the piece of group delay information is calculated using the reception phase information from two neighboring carrier signals each so that two pieces of group delay information for two different frequency values are obtained for at least three carrier signals to obtain a piece of group delay information over frequency of the transmission medium.

Depending on the implementation, advantageously, 20 to 100 carriers are used in a measurement signal so that (n−1) pieces of group delay information can be obtained per frequency analysis and subsequent evaluation of the reception signal, when the measurement signal had n carriers. In order to be able to measure the entire frequency range between 1 GHz and 4 GHz of a coaxial infrastructure, for example, exemplarily five carrier signals of a width of 600 MHz each can be used, which are upmixed from the baseband using a specifically set local oscillator frequency to detect a corresponding frequency section of the transmission medium.

In particular, due to the number of carrier signals in a "trial" and due to the determination of the bandwidth of a trial and due to the corresponding LO control, an optimum compromise can be achieved between a parallel/serial measurement of the transmission medium. When a very large number of carriers per measurement signal is used and a corresponding frequency spacing between the carriers is selected, only a single trial may be entailed for characterizing a corresponding transmission region, i.e. only a single LO setting. This achieves a fully parallel characterization of the transmission medium. If, however, the number of carriers or the carrier spacing is selected to be correspondingly smaller, for a complete characterization of the transmission band, several "trials", like 2 to 10 trials, for example, will be performed, which represents a rather serial measurement of the transmission band, maybe at a very precise frequency resolution, to detect relatively narrow-banded "events" like clear resonance.

This means that the present invention operates as a "distributed" network analyzer, without requiring synchronization between transmitter LO and receiver LO or, generally, synchronization between transmitter and receiver. This procedure is supported by the fact that a cyclic measurement signal is used, which is emitted on the transmitter side in a "continuous loop" so that, on the receiver side, a "snapshot" of the signal arriving on the receiver side is taken irrespective of transmitter timing, provided the receiver comprises information on the LO frequency currently used by the transmitter, which, in embodiments, is achieved using an LO plan which is exchanged between the transmitter and the receiver, typically using a side channel, or is predetermined. However, no precise time synchronizations are necessary here, but a simple non-synchronized clock is sufficient, since the temporal succession of the different LO settings does not have an impact on the precision of the measurement.

In embodiments of the present invention, each frequency section is recorded several times in several snapshots, to increase precision and to eliminate statistical errors, and the group delay information calculated from each "snapshot" are combined to obtain corresponding mean values which, considered statistically, exhibit higher a precision than when using only a single snapshot.

In addition, it is of advantage to form an overlap region between different frequency sections so that, using different LO settings, at least two pieces of group delay information can be obtained for one and the same frequency value. Correction can be performed using these overlap regions to obtain a continuous course without systematically generated level differences for a characterization of the entire transmission band obtained from the different "trials" with different local oscillator settings.

The obtained characteristics of the transmission medium which has been captured in a very broad-band region as regards its group delay information and, in embodiments, also with regard to its attenuation, can be used by a transmitter for useful data to set and, if applicable, dynamically change a corresponding transmitter modulation adjusted to the specific transmission band or a corresponding predistortion when a measurement pass having one or several trials has been performed.

However, the characterization of the transmission medium can also be used to determine whether there are larger defects due to which replacement of the transmission medium could be entailed, or at least closer examination by visual inspection, etc.

BRIEF DESCRIPTION OF THE DRAWINGS

Embodiments of the present invention will be detailed subsequently referring to the appended drawings, in which:

FIG. 4 shows a flow chart representation of an advantageous procedure when calculating the group delay information using at least three and, advantageously, 20 to 100, for example, carrier signals with phase difference correction and phase hop correction;

FIG. 9a shows a table of advantageous value regions for individual parameters;

FIG. 9b shows an exemplary table for LO plan numbers and associated data, like LO frequencies, for example;

FIG. 10a shows an illustration of a measurement of the transmission band having six LO frequencies relative to the group delay;

FIGS. 12a and 12b show an illustration of the group delay or amplitude over frequency after the performed correction.

DETAILED DESCRIPTION OF THE INVENTION

The inventive concept serves for identifying a channel transfer function with regard to the group delay and, advantageously, also with regard to the attenuation feature to be able to obtain based thereon optimum signal transmission as regards maximum data rates in both transmission directions. Since a precise determination of the amplitude frequency response is desired for optimizing the transmission rates, it is of advantage to determine the amplitude frequency response and, in particular, the group delay information over frequency in a precisely resolved manner. In order to obtain an efficient measurement over a large frequency range, in embodiments, a high number of samples can be determined at the same time, but still at high a frequency resolution in the range of 10 MHz. By using a dynamic allocation of the center frequency, it is even possible to increase the frequency resolution by the factor 100 so that a resolution in a range of 100 kHz can even be generated. This allows achieving a parallel detection of a large number of samples of the group delay information or amplitudes, wherein particularly a further increase in resolution is obtained by the dynamic allocation of the center frequency by performing, in embodiments, a plurality of trials at different LO frequencies.

A precisely resolved characterization of the transmission medium allows identifying so-called "notches", i.e. declines in the transfer function by resonances. In addition, other narrow-band effects can be identified, which counteract an optimum utilization of the transmission range. Advantageously, a configurable number of carriers are employed, wherein particularly at least three carriers are used. These can be below, above or on both sides of a carrier, like the center frequency 500 in FIG. 5, for example.

Figure 5:
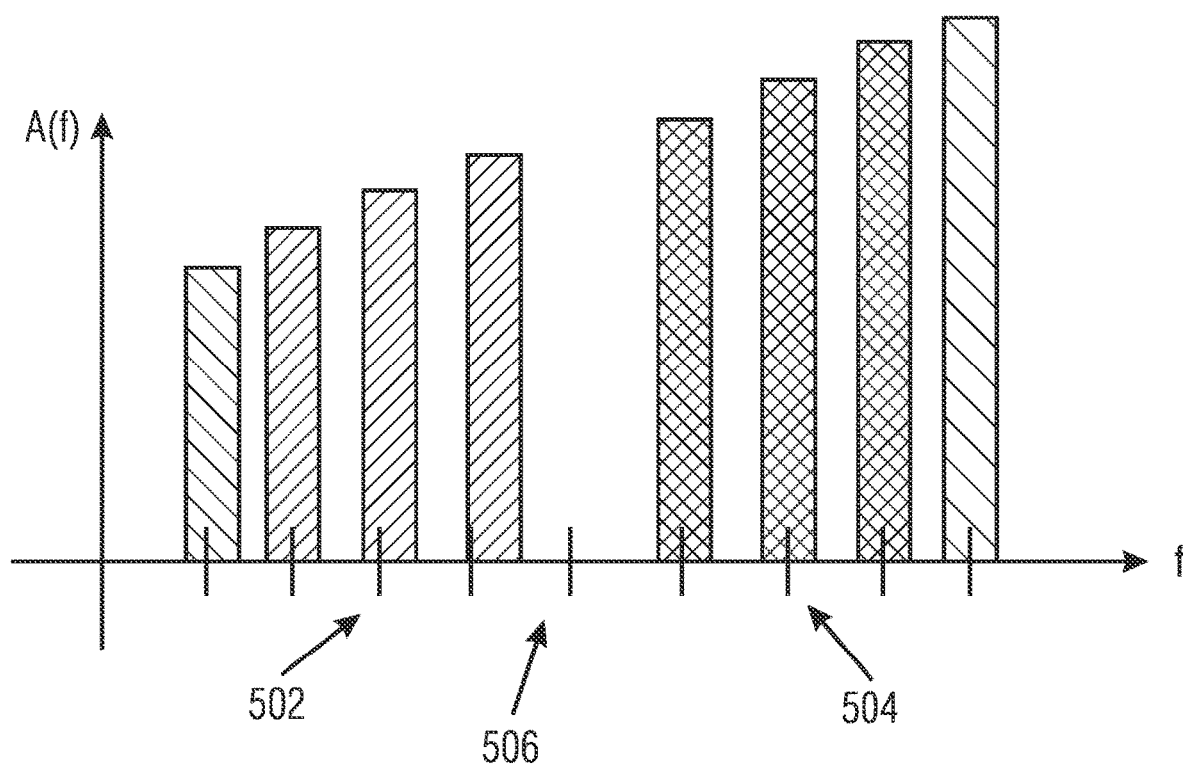
FIG. 5 shows a schematic illustration of determining group delay information for different carriers below and above a center frequency.

In particular, FIG. 5 shows the situation where a number of four carriers, referred to by 502, are arranged below the center frequency and a number of four carriers, referred to by 504, are arranged above the center frequency. For optimizing the signal-to-noise ratio, depending on the implementation, amplitudes can be set differently to compensate an expected channel attenuation, as will be discussed in greater detail referring to the lower representation in FIG. 6. Precision of the measurement values can be achieved by a downstream optimization of the phase positon of the individual carriers in that the transmission and the reception signal have a low crest factor, which has an advantageous effect on the resolution. In particular, the transmission signal comprises the configurable number of carriers and additionally a configuration of different amplitudes can be used, wherein optimization of the phases is of advantage for reducing the crest factor.

The final resolution achieved in the frequency range can be increased considerably by synchronously changing the center frequencies or LO frequencies at the transmitter and the receiver.

FIG. 5 particularly shows an adjustment of the amplitude characteristics to the channel feature in that the amplitudes of the transmission signal, illustrated in FIG. 5, increase with an increasing frequency. This means that the carrier at the smallest frequency, i.e. to the left in the carriers 502 below the center frequency, comprises the smallest amplitude and the carrier at the highest frequency, i.e. to the right in the carriers above the center frequency, comprises the highest amplitude.

Determining the group delay distortions in the transfer function is used for the intended maximization of the data rate. The main field of application is finding and precisely characterizing resonant frequencies, notches or other narrow-band effects within the transmission region to be used. An essential advantage of the present invention is that phase synchronization between transmitter and receiver is not necessary. In addition, only transferring phase information via the transmission signal from the transmitter to the receiver via a side channel is entailed in special embodiments. However, the transfer may also not be performed, in this case, the receiver is configured to estimate the transmission phases, or these are predetermined fixedly between the transmitter and the receiver per carrier frequency. For estimating, it is sufficient for the transmitter to have only a rough indication of the transmission phases when the transmission phases are selected in a certain phase pattern. Advantageously, the phases are selected such that a phase of a carrier signal at a certain frequency is set to a randomly determined value, which can be +90 degrees or −90 degrees. The phase of the carrier adjacent in frequency is set to the phase of the previous carrier plus again a random phase, which is either 90 degrees or −90 degrees. This means that the phase between successive carriers will differ by a magnitude of 90 degrees. Other phase settings, not operating based on a random number, but 90 degrees, 180 degrees, −90 degrees, 0 degrees, etc., for example, in a order increasing in frequency, are also conceivable.

Advantageously, frequency synchronization of transmitter and receiver can be performed to increase the precision of the measurement in another step. Additionally, depending on the implementation, phase synchronization of transmitter and receiver can be used in a further step to further increase precision. Both frequency synchronization and phase synchronization are optional steps which typically imply relatively high complexity. Even without such a frequency synchronization or phase synchronization, very efficient and very precise group delays and attenuation values over frequency can be obtained.

Figure 1:
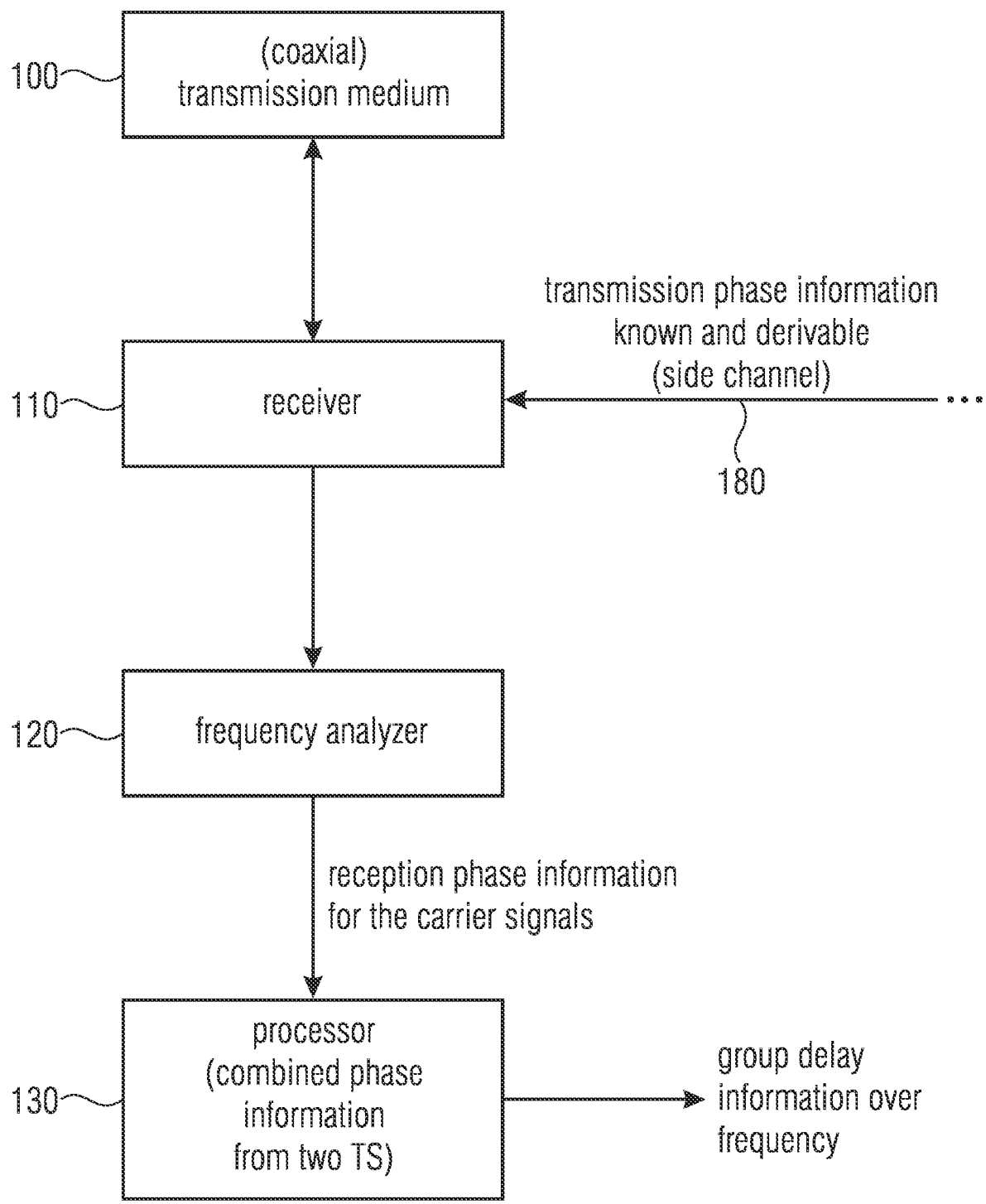
FIG. 1 shows a block circuit diagram of an apparatus for detecting group delay information over frequency.

FIG. 1 shows an apparatus for detecting group delay information over frequency for a wire-bound transmission medium 100, for example. In embodiments, the transmission medium is a coaxial transmission medium and, in particular, an already existing coaxial transmission structure, like a coaxial transmission structure for cable television reception, for example. Alternative transmission media, like two-wire lines, non-coaxial, like copper lines, and also wireless transmission media, can also be measured using the inventive apparatus.

Figure 2A:
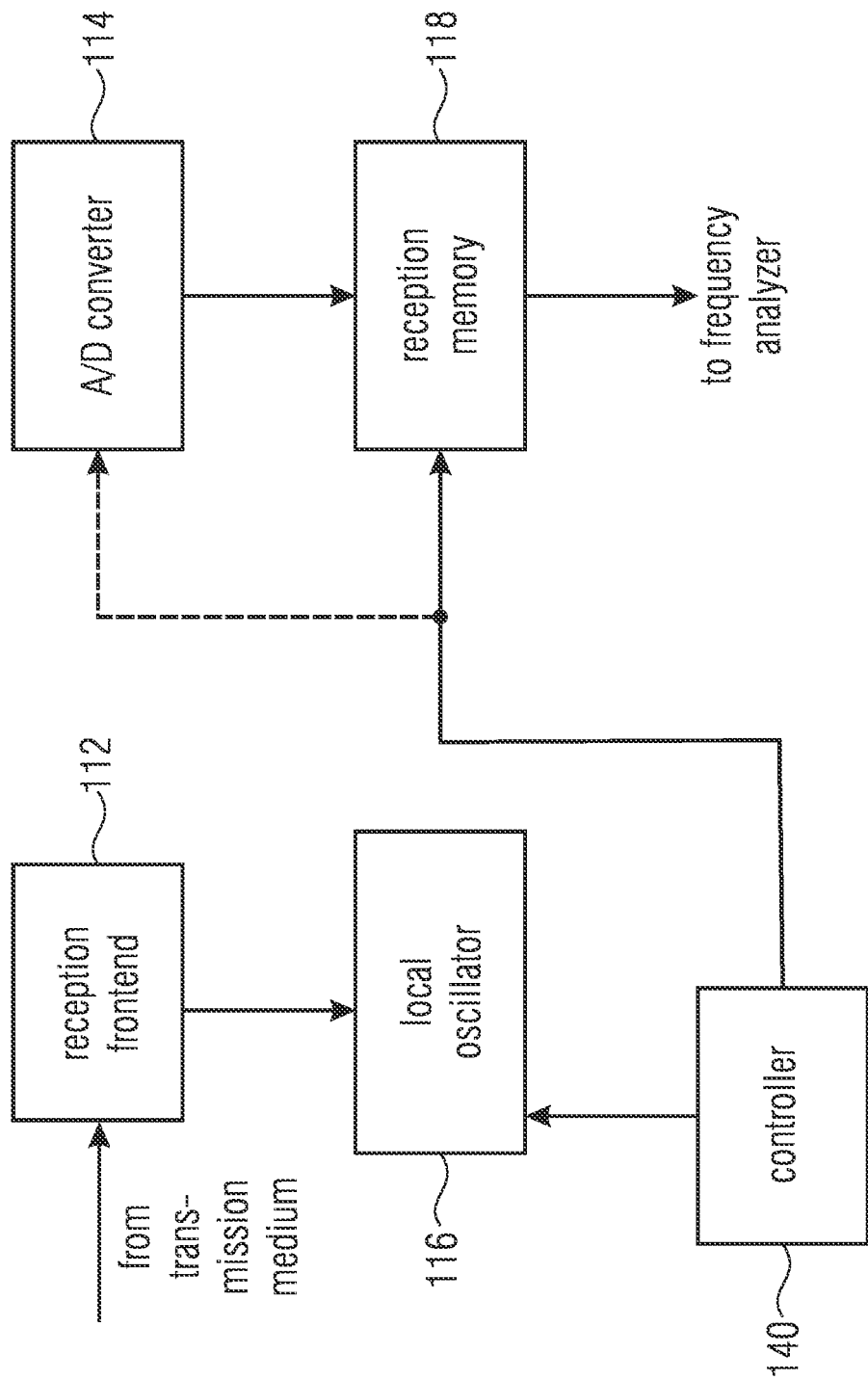
FIG. 2a shows an embodiment of the receiver of FIG. 1.
Figure 2B:
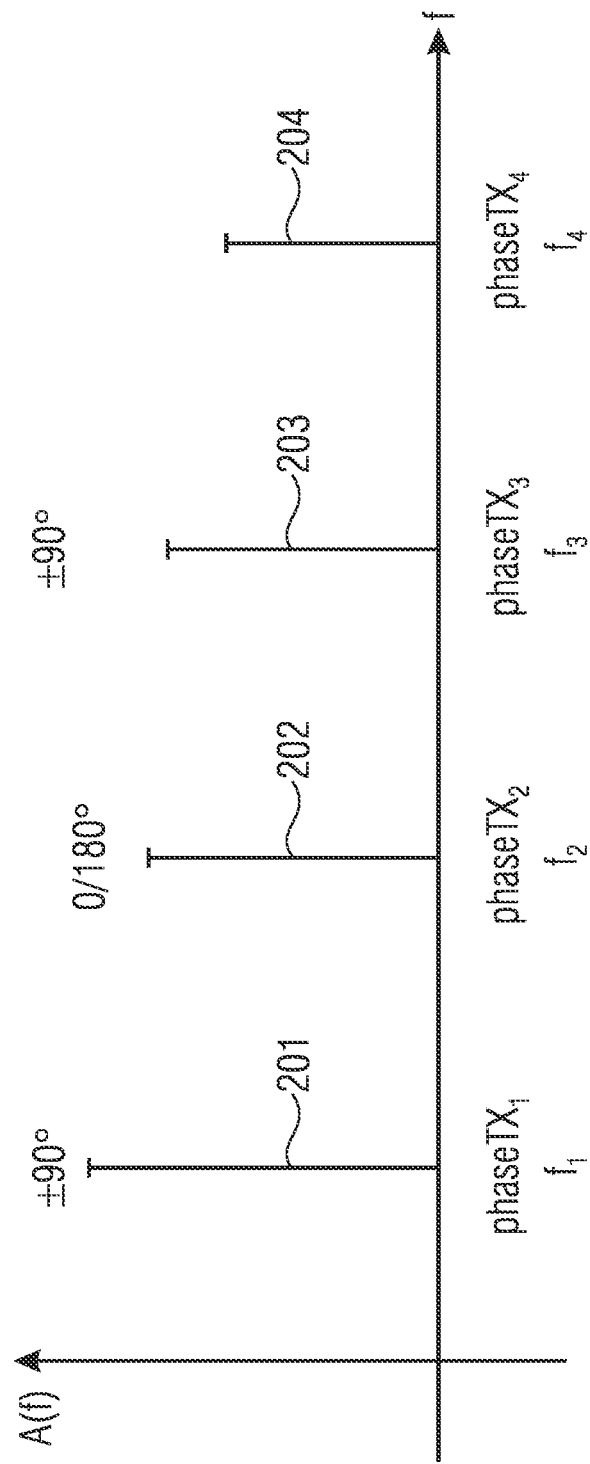
FIG. 2b shows a schematic illustration of a spectrum of the measurement signal when being fed to the transmission medium.

The apparatus comprises a receiver 110 for receiving a measurement signal to provide a reception signal, the measurement signal comprising at least a first carrier signal 301 of FIG. 2b at a first carrier frequency $f_1$, a second carrier signal 202 at a second carrier frequency $f_2$ and a third carrier signal 203 at a third carrier frequency $f_3$, wherein transmission phase information on the carrier signals are known or derivable. In particular, the transmission phase information when feeding the measurement signal to the transmission medium 100 are advantageously known or derivable.

Figure 2C:
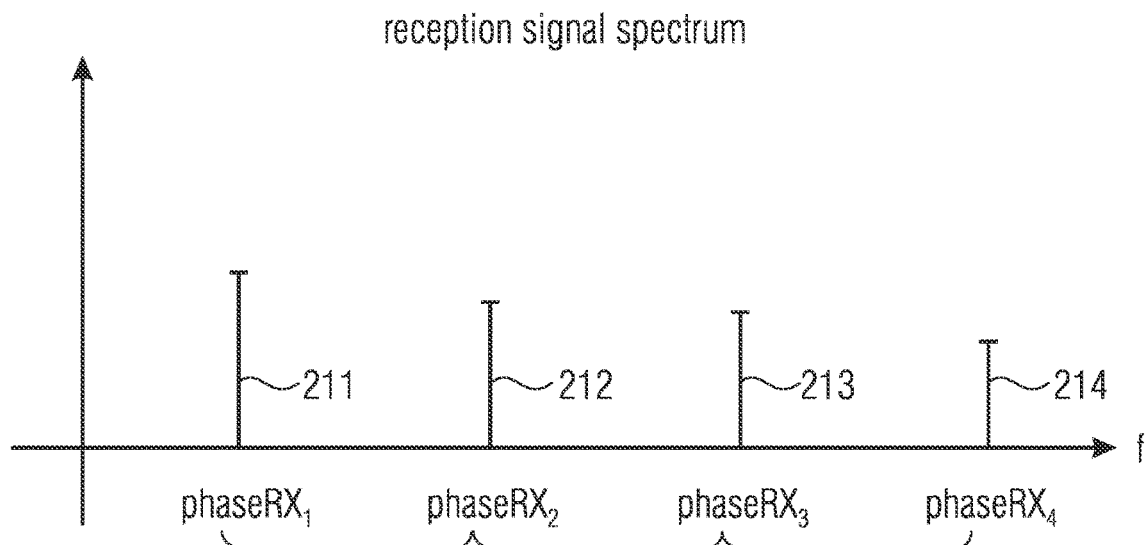
FIG. 2c shows a schematic illustration of the spectrum of the reception signal at the output of the frequency analyzer.

FIG. 2b shows a spectrum of the transmission signal having the carrier signals 201, 202, 203 at the carrier frequencies $f_1$, $f_2$, $f_3$, wherein additionally a fourth carrier signal 204 at a fourth carrier frequency $f_4$ is shown in FIG. 2b. FIG. 2b shows the transmission signal spectrum or spectrum of the measurement signal which, when arriving at a receiver, i.e. when having become the reception signal, comprises the spectrum as is shown in FIG. 2c. The reception signal spectrum will again comprise a first carrier signal 211, a second carrier signal 212, a third carrier signal 213 and a fourth carrier signal 214 which in turn will be at the frequencies $f_2$, $f_3$, and $f_4$. However, the phases of the reception signal spectrum and, in particular, of the carrier signals in the reception signal spectrum will differ from the transmission phases. The same applies to the amplitudes which, due to cable attenuation, in FIG. 2c are indicated to be smaller than in FIG. 2b.

Additionally, the apparatus for detecting comprises a frequency analyzer 120 for analyzing the reception signal, i.e. the signal the spectrum of which is illustrated in FIG. 2c, to obtain reception phase information on the first carrier signal, the second carrier signal and the third carrier signal. In an embodiment, the frequency analyzer provides the reception phases $phaseRX_1$, $phaseRX_2$, $phaseRX_3$ and also $phaseRX_4$ for the carrier signals 211 to 214 of FIG. 2c by means of Fourier transform and, advantageously, by means of direct Fourier transform (DFT). Additionally, the apparatus comprises a processor for forming a first combined piece of phase information from the reception phase information from a first pair of carrier signals and for forming a second combined piece of phase information from the reception phase information from a second pair of carrier signals which differs from the first pair of carrier signals.

The first pair of carrier signals is, for example, carrier signals 211 and 212 and the second pair of carrier signals exemplarily comprises carrier signals 212 and 213. Alternatively, the second pair of carrier signals may also comprise carrier signal 211 and carrier signal 213. However, it is of advantage for the pairs from which the combined phase information are calculated to be pairs of carrier signals mutually adjacent as far as frequency is concerned. A first piece of group delay information is formed by the processor 130 from the first combined piece of phase information. Additionally, the processor 130 is configured to form the second piece of group delay information from the second combined piece of phase information and the transmission phase information of the corresponding second pair. This means that, in accordance with the invention, two pieces of group delay information, which are then associated by the processor 130 to two different frequency values, are calculated from at least three carrier signals in the reception signal.

Figure 2D:
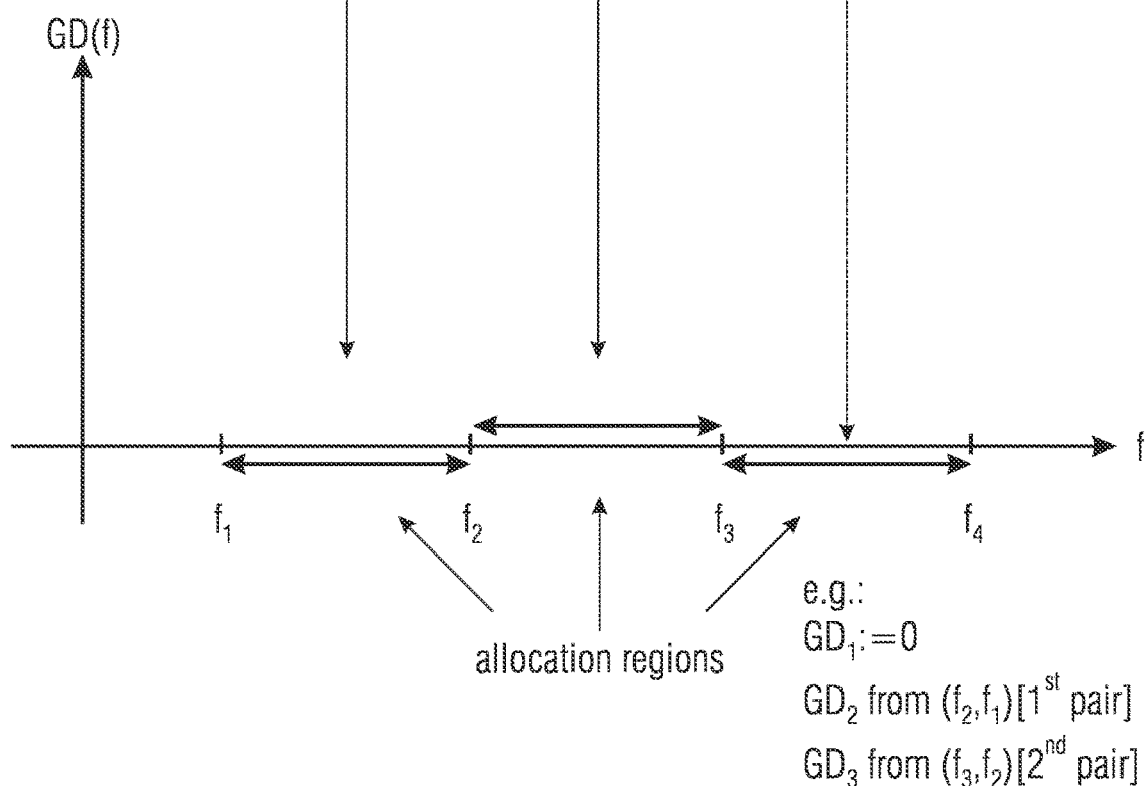
FIG. 2d shows a schematic illustration of allocating the group delay information to corresponding allocation regions.

The processor is particularly configured to perform associating the first piece of group delay information to a first frequency and associating the second piece of group delay information to a second frequency, the first frequency differing from the second frequency and further being derived from frequencies of the first pair of carrier signals. The same applies to the second frequency which is derived from the frequencies of the second pair of carrier signals. The first frequency which the first piece of group delay information is associated to thus originates from one of the allocation regions as illustrated in FIG. 2d. Thus, the first piece of group delay information can exemplarily be associated to the frequency $f_2$, whereas the second piece of group delay information is associated to the frequency $f_3$, whereas the group delay information for the frequency $f_1$ is set to zero, as per definition. Alternative ways of allocation are also possible. The processor can exemplarily be configured to associate the first piece of group delay information to the frequency $f_1$ and the second piece of group delay information to the frequency $f_2$ and a third piece of group delay information derived from a third and a fourth carrier signal to the third carrier frequency $f_3$.

As a further alternative, any other frequency in the allocation region can be used, for example, the center between $f_1$ and $f_2$ for the first piece of group delay information and the center between $f_2$ and $f_3$ for the second piece of group delay information. Due to the implementation of the present invention with several trials using different local oscillator frequencies, however, it is of advantage to set the piece of group delay information for the lowest frequency of a trial to zero. This means that, in particular due to an overlap region between two frequency sections, it can nevertheless be achieved that at least one piece of group delay information will be calculated for each frequency value when the overlap region comprises only one frequency interface. Advantageously, however, the overlap region is several frequency interfaces, like 10 or more, for example, so that, due to setting the piece of group delay information for the lowest frequency of a frequency section to zero, nevertheless an overlap region of 9 frequency interfaces, for example, will remain, comprising two different pieces of group delay information each, from which correction values can be calculated, as discussed below.

Figure 3:
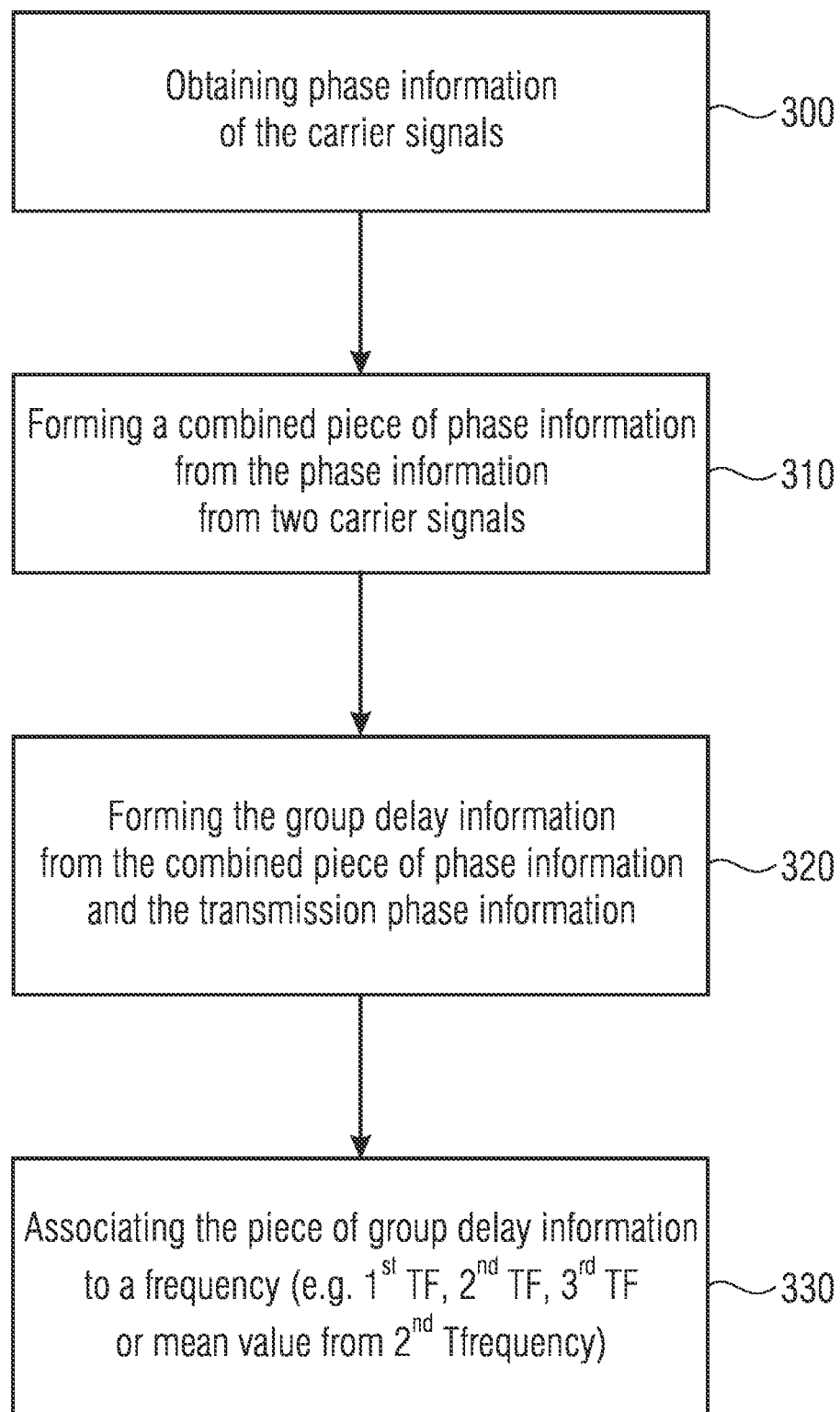
FIG. 3 shows a flow chart of an implementation of the processor of FIG. 1.

This means that the processor is configured, as is illustrated in FIG. 3, by obtaining the phase information of the carrier signals in step 300, as is illustrated by the frequency analyzer 120. The result of step 300 are phase values phaseRX$_1$, phaseRX$_2$, phaseRX$_3$ and phaseRX$_4$. In step 310, a combined piece of phase information each is formed from a pair of carrier signals. In step 320, the piece of group delay information is formed each from a pair of pieces of phase information and the respective transmission phase information referred to as phase values phaseTX$_1$, phaseTX$_2$, phaseTX$_3$ and phaseTX$_4$ in FIG. 2b. In step 330, the group delay information of a pair are each associated to a frequency, as has been illustrated in FIG. 2d.

The frequency analyzer 120 is configured to obtain a reception phase value phaseTX$_1$ for the first carrier signal and a second reception phase value phaseTX$_2$ for the second carrier signal. In addition, the frequency analyzer 120 is configured to obtain a third reception phase value for the third carrier signal. Furthermore, the transmission phase information are given either as absolute phase information or already as a first transmission difference between the first carrier signal and the second carrier signal and as a second transmission difference between the second carrier signal and the third carrier signal.

Additionally, the processor 130 is configured to calculate, as the first combined piece of phase information, a first reception difference from the first reception phase value and the second reception phase value and to calculate, as the second combined piece of phase information, a second reception difference from the second reception phase information and the third reception phase information. Additionally, the processor is configured to calculate the piece of group delay information from the first reception difference and the first transmission difference and associate the same to the first frequency, that is in the allocation region of FIG. 2d. Furthermore, the processor is configured to calculate the second piece of group delay information from the second reception difference and the second transmission difference and allocate the same to the second frequency in the corresponding allocation region between $f_2$ and $f_3$.

The step of calculating the transmission difference, which is also referred to by phaseDiff$_{TX}$, and the step of calculating the reception difference, which is also referred to by phaseDiff$_{RX}$, are illustrated as an equation at 410 in FIG. 4.

phaseDiff$_{Rx}$ represents the first combined piece of phase information, wherein ii equals 1 and ii+1 equals 2. The second combined piece of phase information is obtained when ii equals 2 and ii+1 equals 3. The transmission-reception phase difference is calculated in step 420 from the first reception difference and the first transmission difference. These values, which are referred to by p1, p2, are calculated for each pair of transmission-reception phase difference and reception difference, as is illustrated in step 420.

Advantageously, an optional phase correction is performed by correcting the transmission difference or reception difference, in case absolute phase hops occurring are greater than π between successive phase values. In this case, either 2π is added to the corresponding phase, or 2π subtracted, as is shown at 440 in FIG. 4. The phase threshold responsible for this is 180 degrees or π, however, other phase thresholds can be used depending on the implementation. Phase unwrap is obtained by the phase correction 440.

Another correction in case absolute hops greater than π occur between successive values, is illustrated in step 450, which may also be employed optionally. In particular, an uncorrected piece of group delay information is calculated by the processor in step 420 from the first reception difference and the first transmission difference. Additionally, the processor is configured to calculate an uncorrected second piece of group delay information from the second reception difference and the second transmission difference. Additionally, correction is performed in case a difference between the uncorrected first piece of group delay information and the uncorrected second piece of group delay information is greater than a correction threshold. The correction threshold is 180 degrees or π for an absolute phase hop.

Then, in step 430, conversion of the advantageously corrected piece of group delay information to a time value is performed, i.e. to a time value in nanoseconds, as is illustrated in FIG. 4 by the factor $10^3$, which takes into consideration that the variable freq$_{step}$ is given in megahertz. The variables len$_{freq}$ and freq$_{step}$ will be discussed below.

Advantageously, the receiver 110 is configured to determine the transmission phase information, as has been discussed referring to FIG. 2b, by receiving side information on the transmission phase information, as is illustrated in FIG. 1 by 180, wherein 180 illustrates a side information channel. Alternatively, the receiver 110 is configured to determine the transmission phase information at the receiver using the knowledge on allowed phase values of the transmission phase information. In particular, the ambiguity eliminated by the corrections in steps 440 and 450 may be used to perform a phase value estimation.

Advantageously, the transmission phase information for the carrier of the three carrier frequencies are +90 degrees or −90 degrees and 0 degrees or 180 degrees for another carrier of the three carrier frequencies. This ensures that the a low crest factor of the overall transmission signal can be obtained, which has an increasing importance in particular with an increasing number of carriers in the transmission signal. A reduction in the crest factor is additionally particularly, obtained when a random selection variation is contained either in each phase determination of the transmission signal or in at least every second or every third phase determination of the transmission signal. In particular when setting the phases to +90 degrees or −90 degrees and 0 degrees or 180 degrees for each successive frequency value, the phase threshold in step 440 and the correction threshold in step 450 will each be 180 degrees or π. Advantageously, the number of carrier signals in the measurement signal is at least 30, the 30 carrier signals being associated to 30 different carrier frequencies each which are spaced apart in frequency over a carrier frequency spacing. In particular, the frequency analyzer 120 is configured to calculate a phase value for each carrier signal as reception phase information. Additionally, the processor 130 is configured to determine the group delay information for each carrier frequency except for one carrier frequency so that, for a number of n carrier frequencies received, a number of (n−1) pieces of group delay information are determined which are associated to a number of n−1 frequencies. Additionally, the frequency analyzer 120 is configured to determine one piece of reception amplitude information each for the carrier signals, the processor 130 being additionally configured to determine an attenuation value per carrier frequency using the reception amplitude information.

FIG. 2a shows an embodiment of the receiver 110 of FIG. 1. The receiver comprises a reception front end 112 coupled to a controllable local oscillator 116, which is controllable by a controller 140. The output signal of the reception front end 112 is already in the baseband, due to the local oscillator 116 effect, and is converted by an analog-to-digital converter 114. The output signal of the A/D converter 114 reaches a reception memory 118. The reception memory 118 is also controlled by the controller 140 to record a defined region of the digital signal at the output of the A/D converter 114, in temporal order of recording, to drive the frequency analyzer 120. Depending on the implementation, the A/D converter 114 can be permanently active and the reception memory 118 only records during the time windows indicated by the controller 140 to obtain a "snapshot" each. Alternatively, the A/D converter 114 can be controlled by the controller 140 to only perform an analog-to-digital conversion when recording takes place in the reception memory 118. In this case, the reception memory 118 does not have to be controlled specifically by the controller, but the A/D converter 114. Alternatively, both elements can be driven by the controller.

In an embodiment of the present invention, the receiver 110 is configured to obtain one or more further measurement signals temporally after the measurement signal. In addition, the frequency analyzer 120 is configured to analyze the one or more further measurement signals. In addition, the processor is configured to determine the group delay information over frequency also for the one or more further measurement signals so that a piece of group delay information is obtained from each individual "snapshot" for each carrier frequency value. Advantageously, the processor 130 is configured to determine, from the group delay information for the measurement signal and the one or more further measurement signals, the group delay information for the individual carrier frequencies by selecting or combining group delay information from different snapshots.

Depending on the implementation, the first carrier signal, the second carrier signal and the third carrier signal are sinusoidal. In this case, the frequency analyzer is configured to perform a Fourier analysis of the measurement signal. Alternatively, advantageously periodic carrier signals differing from sinus signals can also be used. In such a case, the frequency analysis is to be adjusted to different "basic functions" than sinus signals from which the measurement signal is set up.

In an embodiment of the present invention, the receiver 110 is configured to convert a first frequency section to the baseband using a first local oscillator frequency. In addition, the receiver 110 is configured to convert a second frequency section to the base band using a second local oscillator frequency. In particular, the receiver is configured to set, using a fixed schedule or a schedule received via a side channel, the first local oscillator frequency and the second local oscillator frequency offset in time. In addition, the first local oscillator frequency and the second local oscillator frequency are set such that the first frequency section and the second frequency section overlap in an overlap region so that several pieces of group delay information each are obtained for carrier frequencies in the overlap region from measurements having different local oscillator frequencies.

Depending on the implementation, the receiver is configured to perform one-sideband demodulation using the first local oscillator frequency and the second local oscillator frequency. FIG. 10a shows different local oscillator frequencies $LO_1$, $LO_2$, $LO_3$, $LO_4$, $LO_5$ and $LO_6$. In addition, the lower sideband is illustrated to be used in the one-sideband demodulation with the local oscillators $LO_1$, $LO_2$, $LO_3$, whereas the upper sideband is used with the local oscillator frequencies $LO_4$, $LO_5$, $LO_6$. Additionally, certain overlap regions 10a, 10b, 10c, 10d, 10e are illustrated in FIG. 10a. Additionally, the third local oscillator frequency $LO_3$ is illustrated to be higher in frequency than the fourth local oscillator frequency $LO_4$ in the overlap region 10c. The change of the one sideband used for demodulation from the upper to the lower sideband is shown, which is of advantage due to the corresponding frequencies and the local oscillators being easy to handle.

Figure 10B:
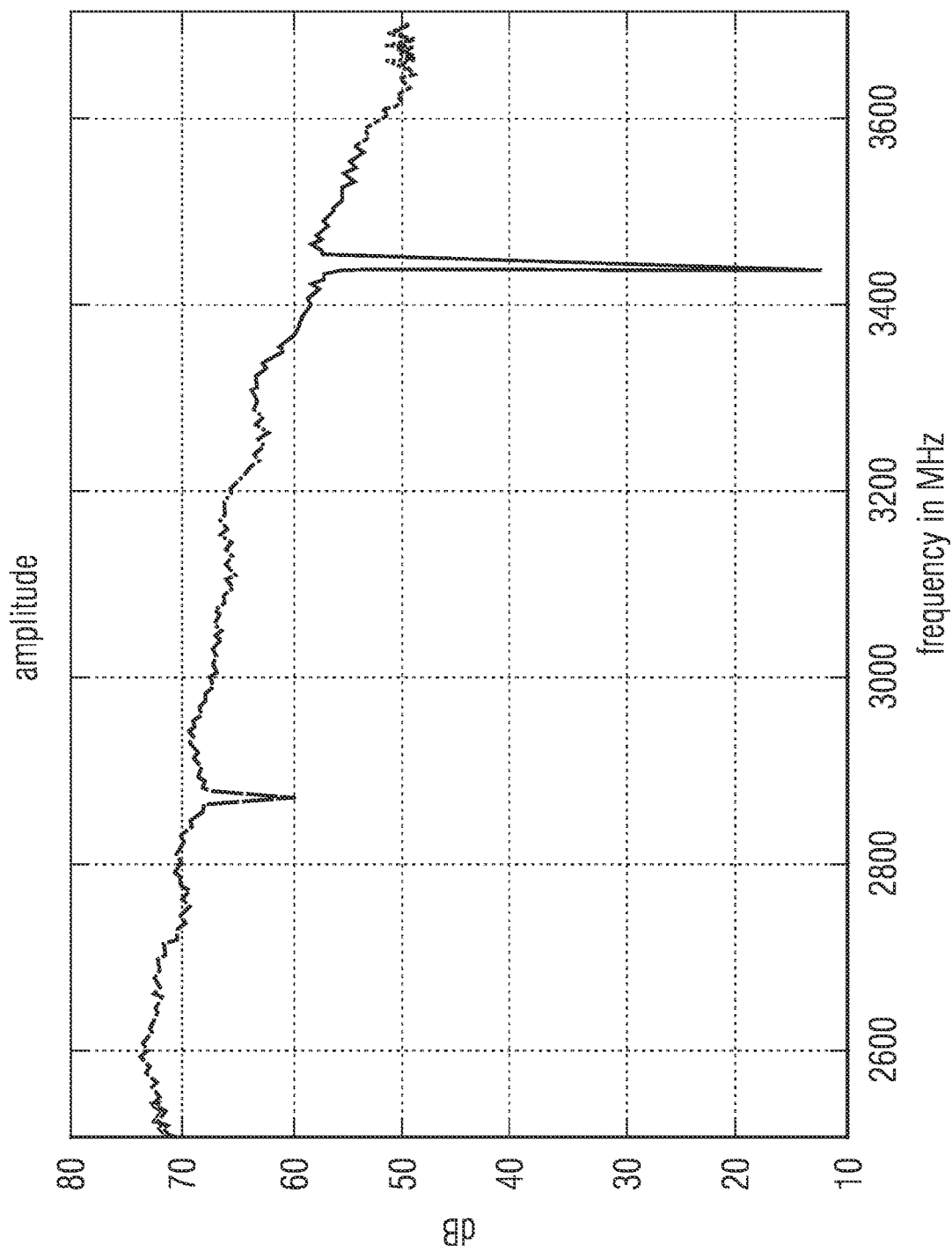
FIG. 10b shows an illustration in analogy to FIG. 10a, but for amplitudes.
Figure 11:
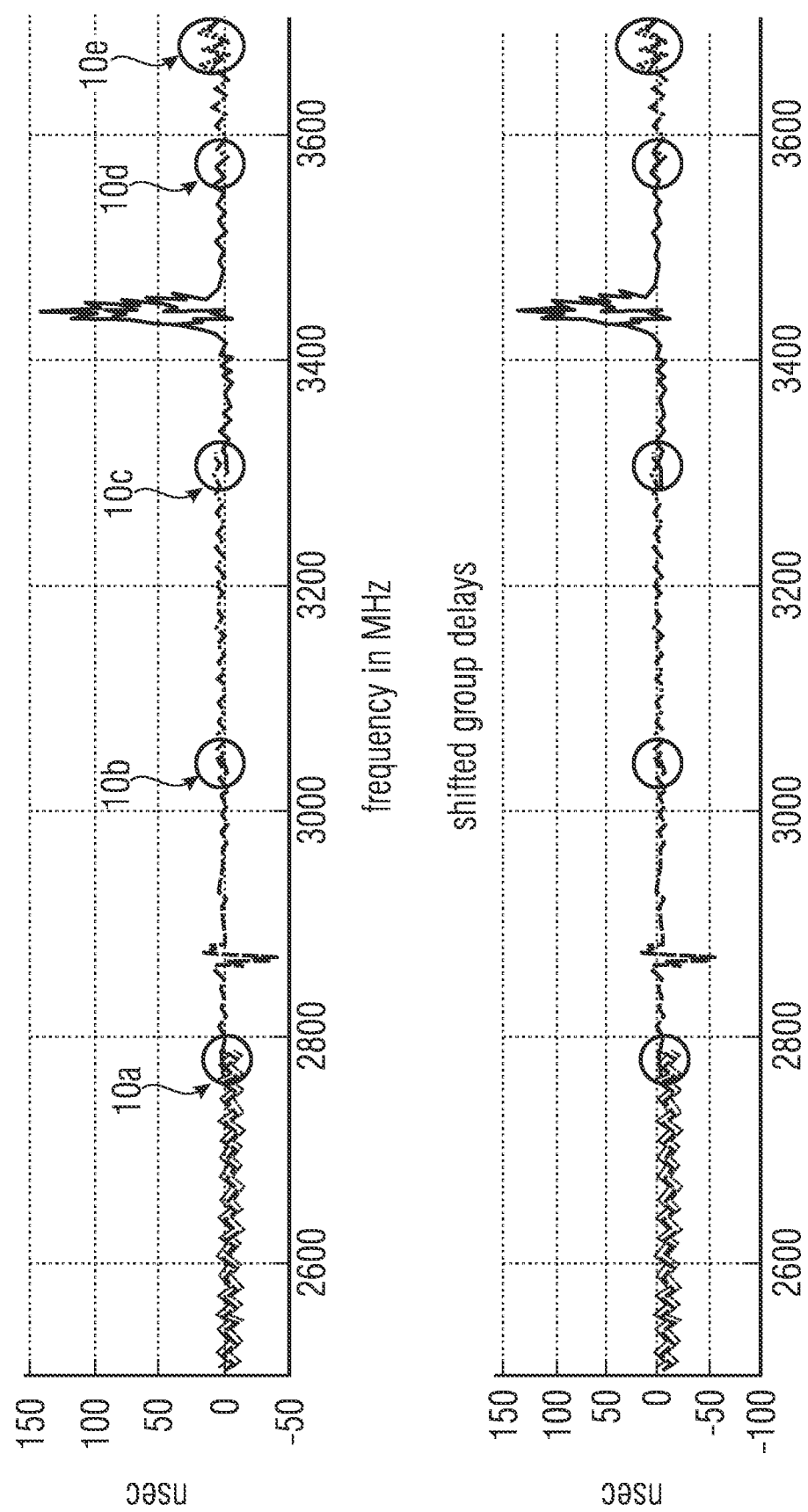
FIG. 11 shows an illustration of the group delay information over frequency in the entire transmission band before and after correction due to the overlap regions.

Overlap regions 10a to 10e are further used to bring the group delay information and, if applicable, the amplitude information, as are illustrated in FIG. 10a and FIG. 10b, to the same level, as is illustrated in FIG. 11 and will be discussed below. Here, the processor 130 is configured to modify, using the group delay information for the different local oscillator frequencies in an overlap region, group delay information outside the overlap region for the first frequency section and/or the second frequency section to reduce or eliminate discontinuities due to the different local oscillator frequencies. In particular, the processor 130 here is configured to form a first mean value from the group delay information of the first frequency section in the overlap region and to form a second mean value from the group delay information of the second frequency section in the overlap region. Additionally, using the first mean value and the second mean value, a correction value is calculated, which is then used to correct the group delay information of the first frequency section or of the second frequency section so as to obtain corrected group delay information. Depending on the implementation, the correction is a combination of the correction value and the respective group delay information, like an addition or subtraction, for example.

In particular, the processor 130 here is configured to eliminate outliers before calculating the first or second mean value, wherein this may be performed using a cumulative distribution function having a maximum and minimum quantile.

Depending on the implementation, not only a single overlap region 10a is set, but several, like 5 overlap regions, for example, which are illustrated in FIG. 10a. The processor 130 here is configured to calculate the group delay information for a third frequency section, which overlaps with the second frequency section in a second overlap region. Particularly, the processor 130 is configured to use, for calculating a correction value for the third frequency section, a correction value from the overlap region between the first frequency section and the second frequency section, apart from mean values in the third overlap region, so that the correction values "propagate" over the entire frequency range, i.e. the correction value of the highest frequency section, as regards frequency, is calculated from the correction values of the frequency sections of low frequency, in addition to the respective mean values.

In embodiments of the present invention, the processor 130 is additionally configured to determine control information for a transmitter for the transmission medium using the group delay information to obtain a desired transfer rate and/or a desired maximum error rate when transmitting via the transmission medium. As has been explained before, the transmission medium advantageously is a coaxial transmission medium and, in particular, an already existing coaxial infrastructure in which a bandwidth of the reception signal is between 50 MHz and 500 MHz and a measurement region of the coaxial infrastructure is between 1000 and 5000 MHz.

FIG. 13 shows an apparatus for transmitting a measurement signal via a transmission medium, which is illustrated in FIG. 13 again as a (coaxial) transmission medium 100. The apparatus for transmitting comprises a processor 410 for generating the measurement signal, which is illustrated in FIG. 2b, and a first carrier signal 201 at first carrier frequency $f_1$, a second carrier signal 202 at a second carrier frequency $f_2$ and a third carrier signal 203 at a third carrier frequency $f_3$. The measurement signal is passed on to a transmitter 420 configured to feed the measurement signal to the transmission medium 100.

Depending on the implementation, the processor 410 comprises a digital adder 412, a transmitter memory 414 and an digital-to-analog converter 416. Additionally, the apparatus for transmitting advantageously comprises a controller 430 which is able to transmit transmission phase information via the side channel 180 to the receiver 110 of FIG. 1, i.e. from the apparatus for detecting the group delay information.

Additionally, in an embodiment of the present invention, the transmitter comprises a local oscillator 424 which can be driven by the controller 430, and a transmitter front end 422 which particularly comprises an upmixer. The processor 410 is configured to generate the measurement signal in a baseband, and the transmitter 420 is configured to convert, using the local oscillator 424 the measurement signal from the baseband to a transmission band, which is higher in frequency than the baseband. In addition, the processor 410 is configured to generate the measurement signal by digitally summing up, by means of the digital adder 412, using sinusoidal carrier signals at the individual carrier frequencies, the sinusoidal carrier signals having defined phases to one another, which represent the transmission phase information. The digital signal is then stored in a transmitter memory 414 and converted to an analog form by the digital-to-analog converter 416. In particular, the processor 410 is additionally configured to cyclically generate the measurement signal using the digital adder 412 controlled by the controller 430, i.e. generate the same as a cyclic signal comprising a certain length in digital samples, and configured such that there will be no discontinuities when "piecing" the beginning of the cyclic measurement signal again to the end of the cyclic measurement signal.

The cyclic measurement signal having been generated by the digital adder 412 is stored in the transmitter memory 414 and subsequently transferred to the digital-to-analog converter 416 for a defined number of times so that a base band signal is obtained at the output of the digital-to-analog converter in the digital domain, comprising a sequence of analog versions of the measurement signals. Additionally, the transmitter is configured to convert the base band signal to a transmission band using the local oscillator 424 and feed it to the transmission medium 100. For generating the transmission signal in the different frequency portions, the local oscillator 424 may be controlled in the same way as is the local oscillator of the receiver, which performs a corresponding downmixing. Additionally, the transmitter front end 422 is configured to perform a one-sideband modulation to obtain the corresponding transmission signals, which then, at the receiver side, result in the corresponding frequency ranges, as are illustrated in FIG. 10a with the overlap regions 10a to 10b.

Subsequently, an implementation of the present invention will be illustrated referring to FIGS. 8 to 13. Advantageously, the transmitter illustrated in FIG. 13 generates a measurement signal, which comprises a special distribution of the amplitude and phase information, and cyclicity. The measurement and evaluation are performed by emitting and receiving the measurement signal, which has a phase distribution, in order for a good measurement signal with regard to the optimized crest factor to be obtained. In particular, the signal may be completely cyclic in the time domain so as to allow any sample time at the receiver. The reference phase is determined from two carriers. Starting from the third carrier, the group delay is calculated while considering the reference phase. The fixed resolution in the frequency range predetermined by the measurement set up can be increased by synchronously changing the center frequency at the transmitter and receiver. It is of advantage that this kind of measurement results can be achieved without a frequency normal on both sides. Thus, the present invention can also be referred to as "distributed network analyzer". In particular, a measurement signal, i.e. a cyclic measurement signal, is generated, which is suitable for the evaluations as have been described referring to FIG. 4, wherein, however, no frequency and phase synchronicity between receiver and transmitter is required, but may optionally be used.

Figure 7:
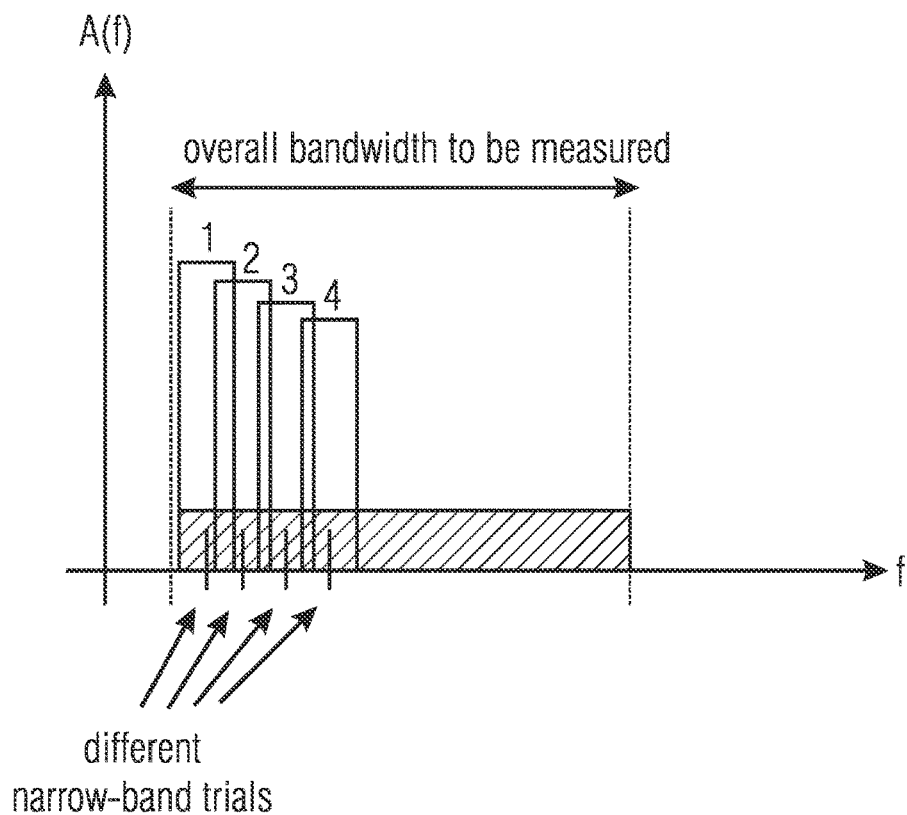
FIG. 7 shows a schematic illustration for illustrating overlap regions between neighboring frequency sections, each frequency section consisting of a plurality of carrier signals.

Advantageously, the channel is excited by different narrow-band trials, as is illustrated in FIG. 7. Here, signal center frequencies alone, signal bandwidths alone or both center frequencies and bandwidths together are adapted, advantageously without interruptions, such that the entire useful spectral range can be "mapped" by means of this measurement, with regard to a signal-to-noise ratio achievable and/or a signal-to-interference ratio achievable.

The following may be performed for generating a measurement signal.

The measurement signals for the individual trials are generated as follows:

the sample rate $SAMPLE_{FREQ}$ is selected in dependence on the ADC and DAC additionally, the following parameters are given:
the bandwidth $BW_{use}$ in MHz
the number of samples used $NUM_{SAMPLES}$
the spacing, in samples, between the individual frequencies $TX_{SPACING}$ the frequency indices used $freq_{idx}$ are calculated from these parameters:

$$freq_{step} = \frac{SAMPLE_{FREQ}}{NUM_{SAMPLES}} * TX_{SPACING}$$

$$freq_{idx} = TX_{SPACING}, 2*TX_{SPACING}, \ldots, \left\lfloor \frac{|BW_{use}|}{freq_{step}} \right\rfloor * TX_{SPACING}$$

$$len_{freq} = \text{length}(freq_{idx})$$

At least three carriers per recording are used to be able to calculate the group delay (see chapter 2.5).
The frequencies $freq_{MHz}$ result from this:

$$freq_{MHz} = freq_{idx} * \frac{SAMPLE_{FREQ}}{NUM_{SAMPLES}}$$

Calculating the amplitudes amp[idx]:

$$amp[idx] = (freq_{idx}[idx] - \min(freq_{idx})) * \frac{amp_{factor} - 1}{\max(freq_{idx}) - \min(freq_{idx})} + 1,$$

wherein idx=1, ..., len$_{freq}$ and amp$_{factor}$ can be selected as desired, so as to obtain the amplitude characteristics of FIG. 1. When selecting amp$_{factor}$=1, the following will result:

amp[idx]=1.

Calculating the phases phase[idx]:

phase[0]=random(90,−90)

phase[idx]=phase[idx]+random(90,−90)

wherein idx=1, ..., len$_{freq}$ and random(90,−90) are selected randomly to be either 90 or −90.

From the amplitude values amp[idx] and phase[idx], dac$_{val}$[ii] results for the DAC samples:

$$dac_{val}[ii] = \sum_{idx=1}^{len_{freq}} \left( amp[idx] * \exp\left(2j*\pi*(ii-1)*\frac{freq_{idx}[idx]}{NUM_{SAMPLES}} + \left(phase[idx]*\frac{\pi}{180}\right)\right)\right)$$

wherein ii = 1, ..., NUM$_{SAMPLES}$ and len$_{freq}$ = (length of freq$_{idx}$).

Figure 6:
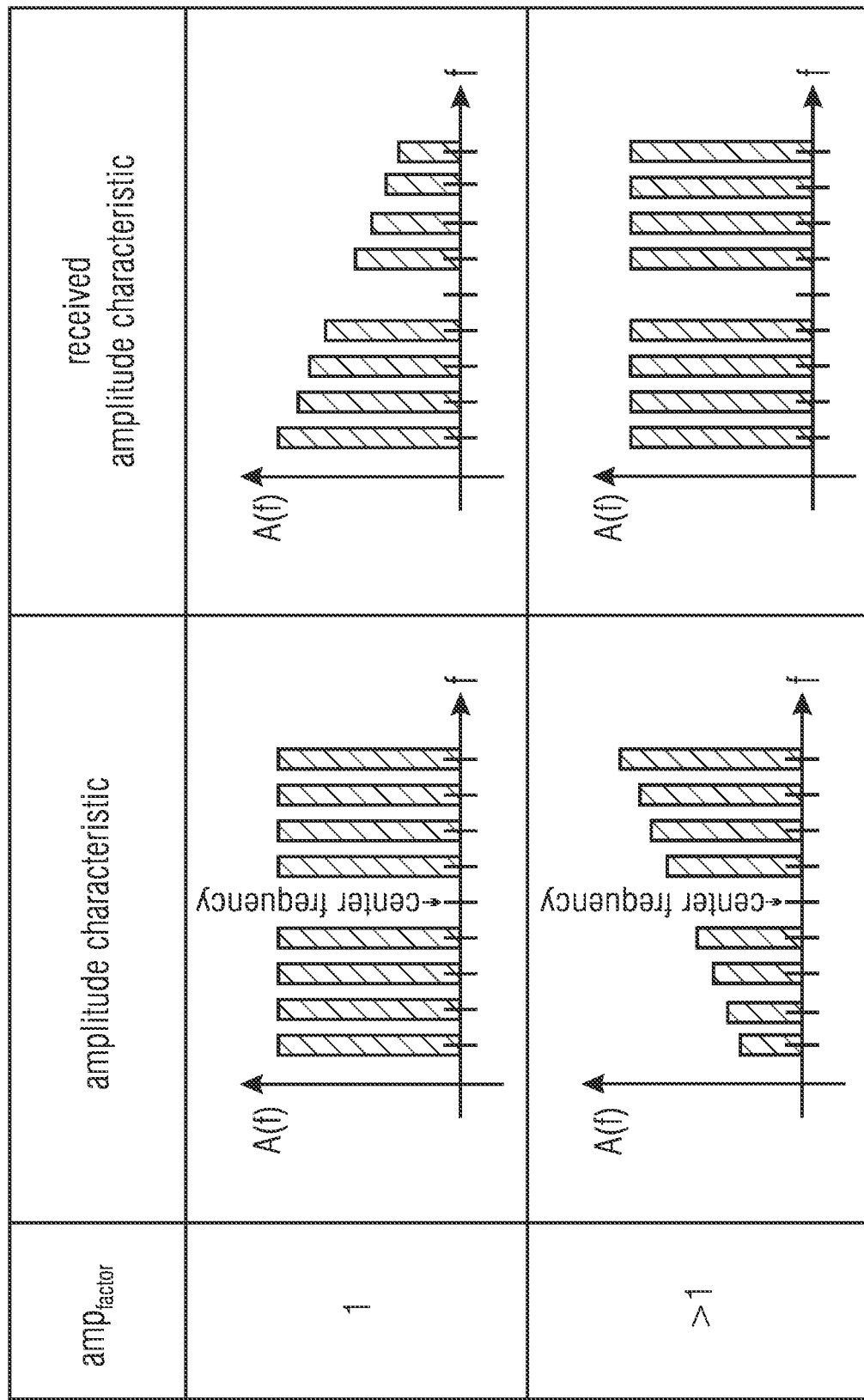
FIG. 6 shows different alternatives of setting the transmission and the reception amplitude characteristic.

The factor amp$_{factor}$>1 is, in accordance with the channel, selected such that the spectrum of the reception signal is no longer decreasing (see FIG. 6).

Using these DAC samples, several trials are started pursuant to a predetermined plan lo$_{plan}$.

The plan lo$_{plan}$[ii] contains the following parameters:
lo$_{freq}$, depending on the parameter iqinvert, indicates the start frequency or the stop frequency.
iqinvert indicates whether lo$_{freq}$ is the start frequency or the stop frequency. iqinvert=True means that lo$_{freq}$ is the start frequency, whereas in the case of iqinvert=False, lo$_{freq}$ is the stop frequency.
time$_{set}$ indicates the time indicating after how many seconds after the start of the measurement the plan is to be realized.

For making the plan lo$_{plan}$[ii], the following steps are used:

Setting the parameters:
Number of snapshots NUM$_{shapshots}$ per step of equal center frequency
Number of frequencies OVERLAP$_{MEASURE}$ which are to overlap at the end of the frequency band of plan [ii] with the beginning of the frequency band of plan [ii+1]
Time time$_{start}$ in seconds, which the system uses for starting
Time time$_{smapshot}$ in seconds, which the system uses for a snapshot
Used parameters from the calculation of the DAC signal dac$_{val}$:
freq$_{step}$: spacing between two carriers
len$_{freq}$: number of carriers used
freq$_{max}$=max(freq$_{MHz}$)
Calculating the center frequency center$_{freq}$ of the channel to be measured:

$$center_{freq} = \frac{txlowfreq + txhighfreq}{2},$$

wherein txlowfreq is the minimum frequency and txhighfreq is the maximum frequency of the channel to be measured.

Calculating the start or stop frequency lo$_{freq}$[ii] and the parameter iqinvert[ii]:

cur$_{freq}$[ii]=cur$_{freq}$[ii−1]−OVERLAP$_{MEASURE}$*freq$_{stepping}$ with cur$_{freq}$[0]=txlowfreq lo$_{above}$=cur$_{freq}$[ii]+freq$_{max}$ lo$_{below}$=cur$_{freq}$[ii]

In case |lo$_{above}$−center$_{freq}$|≤|lo$_{below}$−center$_{freq}$|, the following applies:

lo$_{freq}$[ii]=lo$_{above}$ iqinvert[ii]=True, otherwise, the following applies:

lo$_{freq}$[ii]=lo$_{below}$ iqinvert[ii]=False

This condition ensures that the center frequency is outside the trials (see FIG. 1 and table 1).

This routine will be performed until the condition $$cur_{freq}[ii+1] \geq \left(txhighfreq - \frac{3}{2} * freq_{step}\right)$$

is fulfilled.

Calculating the time time$_{set}$[ii]

time$_{set}$[ii]=time$_{set}$[ii−1]+time$_{snapshot}$*NUM$_{SNAPSHOTS}$

For the frequencies of the trials, with the parameters freq$_{MHz}$, lo$_{freq}$ and iqinvert=True, the following applies:

freq$_{Trial}$[idx]=lo$_{freq}$−freq$_{MHz}$[len$_{freq}$+1−idx], with idx=1, ..., len$_{freq}$ and lo$_{freq}$ as the stop frequency.

For the frequencies freq$_{Trial}$[idx] of the trials, with the parameters freq$_{MHz}$, lo$_{freq}$ and iqinvert=False, the following applies:

freq$_{Trial}$[idx]=lo$_{freq}$+freq$_{MHz}$[idx]

with idx=1, ..., len$_{freq}$ and lo$_{freq}$ as the start frequency.

Figure 13:
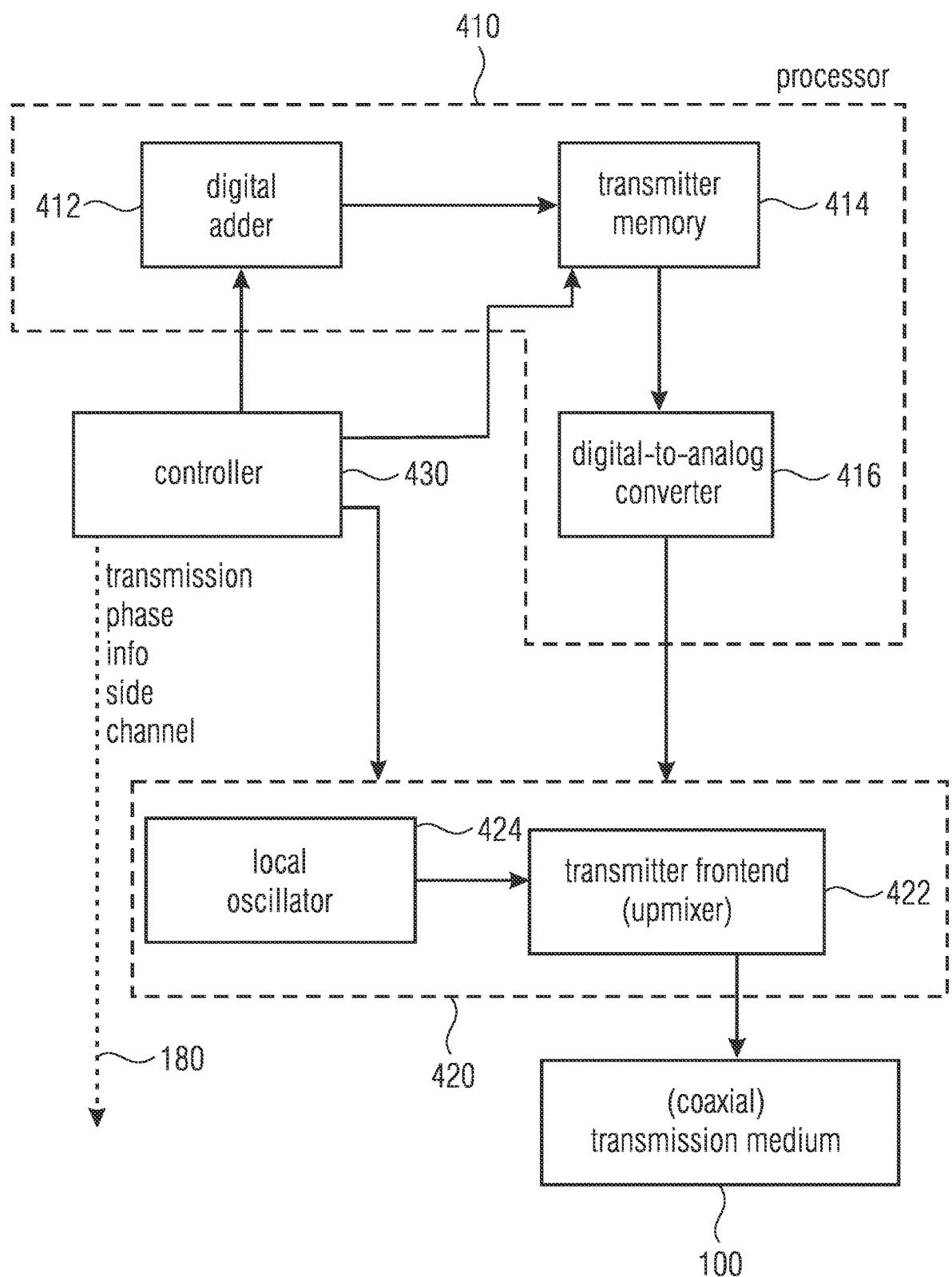
FIG. 13 shows a block circuit diagram illustration of an apparatus for transmitting the measurement signal via a transmission medium.

Advantageously, the local oscillator control of the receiver-side local oscillator 116 on the one hand and the transmitter-side local oscillator 424 of FIG. 13 on the other hand is performed pursuant to the LO plan described before.

Both directions of the channel are measured at the same time (see FIG. 3). After making the plans on both sides, the plans are performed one after the other on both sides in the TX case using the DAC signal dac$_{val}$ in a time-controlled manner using the parameter time$_{set}$ (see FIG. 8). Irrespective of this, in the RX case, the received signals are also stored a time-controlled and temporally cyclic manner on both sides using the corresponding plans, since RX and TX are unsynchronized.

Figure 8:
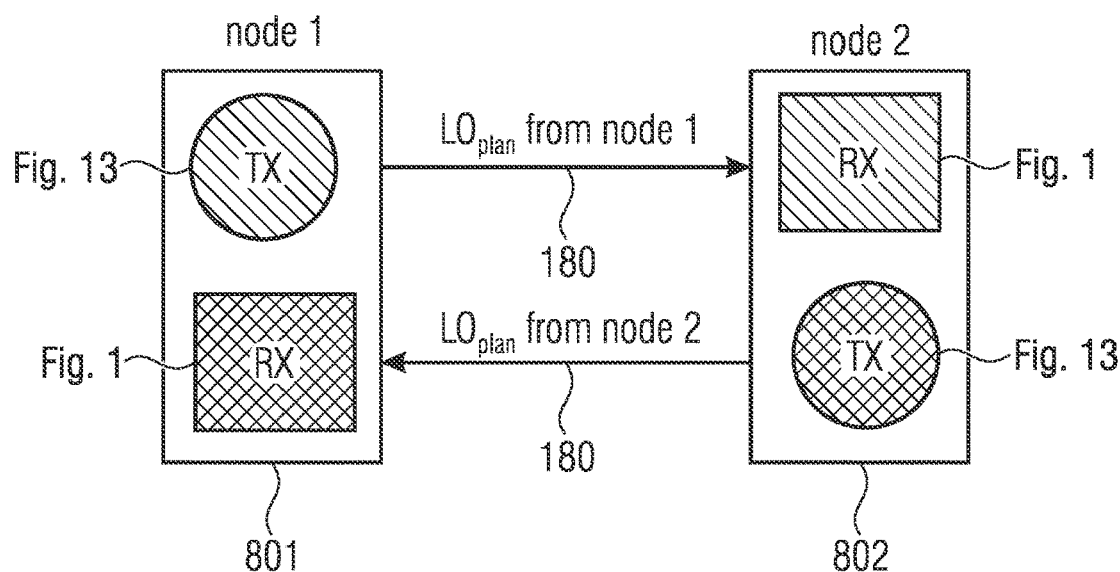
FIG. 8 shows a schematic illustration of two nodes, each node comprising an apparatus for detecting (RX) and an apparatus for transmitting (TX) and a side channel for the LO plan.

FIG. 8 schematically illustrates the simultaneous measurement of the channel in both directions. A first node 1, referred to by 801, and a second node 2, referred to by 802, cooperate, wherein LO$_{plan}$ is transferred from node to node 2 via the side channel 180, and LO$_{plan}$ is transferred from node 2 to node 1. The respective transmitter TX corresponds to the apparatus illustrated in FIG. 13, whereas the receiver RX each corresponds to the apparatus, illustrated in FIG. 1, with the respective described embodiments.

After having finished recording and undergone all the plans, the group delay with amplitudes of the individual snapshots is calculated from the received signals.

FIG. 9a shows advantageous value regions for certain previously mentioned parameters. Correspondingly, FIG. 9b shows a special example of different LO frequencies, which correspond to respective LoPlan numbers, with a respective parameter value iqinvert. These examples roughly correspond to the values as are illustrated, for example, in FIGS. 10a, 10b, 11 for the individual frequency portions.

Here, the overlap regions of two adjacent frequency bands will be considered. Two mean values are formed from the results within the overlap regions, i.e. for the end of the front frequency band and for the beginning of the successive frequency band. In order not to corrupt the result of the mean value, outliers within the overlap regions are removed for calculating the mean value.

The outliers can be found using the following method:
Calculating the CDFs from the values of the front frequency band for all the overlap regions
Calculating the CDFs from the values of the successive frequency band for all the overlap regions
The quantile values q1 and q3 at 25% and 75% are calculated for all CDFs
All the values for which the following applies, are said to be outliers:

$$val_i < (q1-(q3-q1))*precision$$

or $$val_i > (q1+(q3-q1))*precision,$$

with $val_i$=value within an overlap region, precision=predetermined fixed multiplication value After having removed all the outliers, the mean values are calculated from the remaining values. The correction value $correction_{j+1}$ for the region (j+1) results as a sum of the correction valued $correction_j$ of the region j, the mean value $firstOverlap_{j+1}$ from the end of the front frequency band and the negative mean value $secondOverlap_{j+1}$ from the beginning of the successive frequency band:

$$correction_{j+1} = correction_j + secondOverlap_{j+1} - firstOverlap_{j+1}.$$

with $correction_1=0$ for the first region and j=1, . . ., (number of frequency bands−1).

Depending of the frequency band j, the respective correction values correction are added to the group delays or amplitude values.

For each frequency bin, the mean value is formed from the shifted values and the result used as a group delay course or amplitude course for further calculation.

Figure 12A:
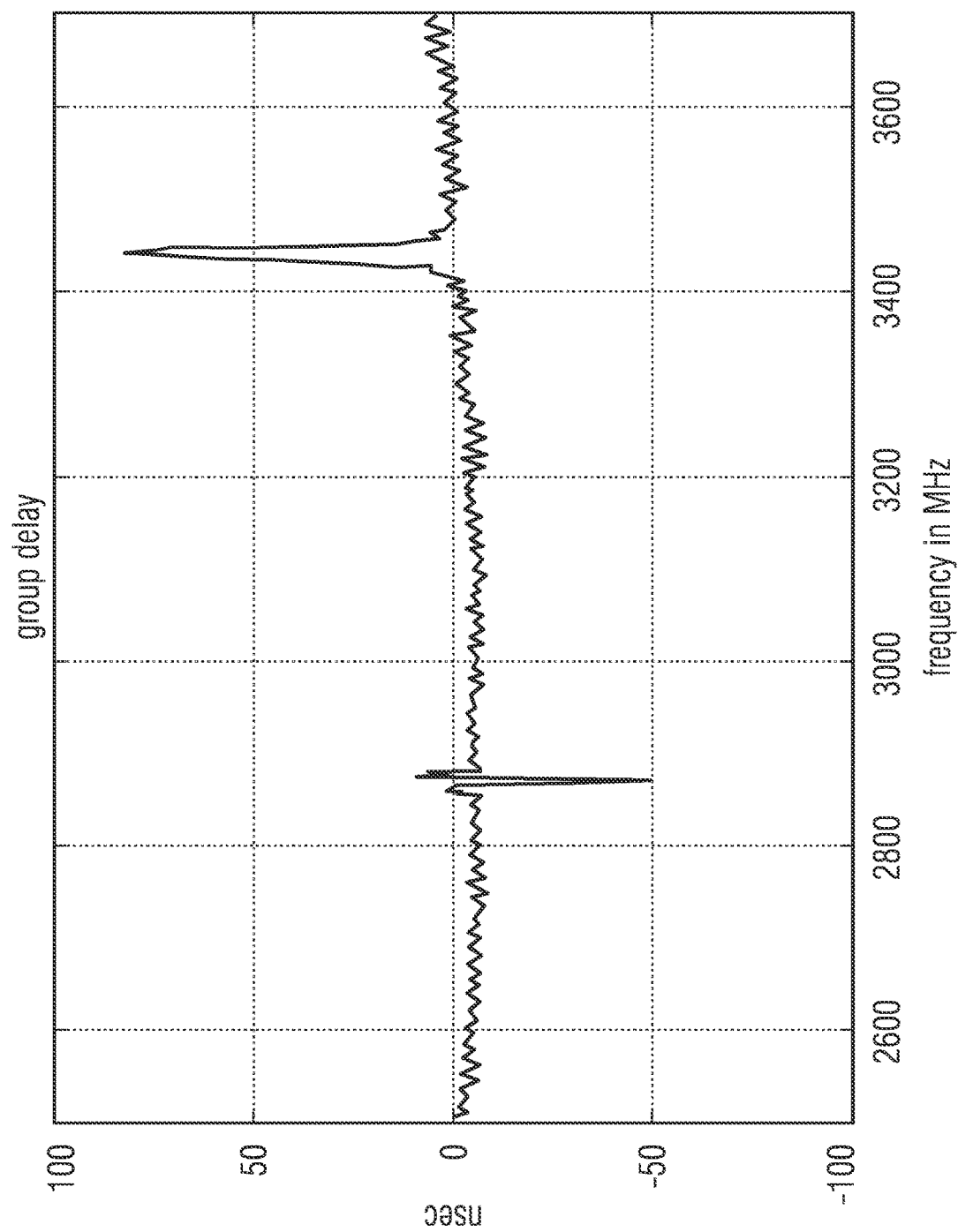

FIGS. 12a and 12b show a result, as is obtained by the apparatus of FIG. 1, i.e. a continuous course of the group delay information over frequency and the amplitude information over frequency in the entire particularly interesting frequency band from roughly 2500 MHz to 3700 MHz. However, it is to be pointed out that correspondingly a complete continuous high-resolution region recorded efficiently can already be obtained for the transmission medium from the frequency of 1000 MHz to 5000 MHz or above or below. The information from FIGS. 12a or 12b can then be used to perform repairs in the infrastructure, or to correspondingly drive a transmitter/receiver for useful data so as to obtain good utilization. Alternatively or additionally, the information can also be used for a pre-distortion on the transmitter side.

Although some aspects have been described in the context of an apparatus, it is clear that these aspects also represent a description of the corresponding method, such that a block or device of an apparatus also corresponds to a respective method step or feature of a method step. Analogously, aspects described in the context of or as a method step also represent a description of a corresponding block or item or feature of a corresponding apparatus. Some or all of the method steps can be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be a universally applicable hardware, such as a computer processor (CPU) or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for detecting group delay information over frequency for a transmission medium, comprising:
  a receiver for receiving a measurement signal to provide a reception signal, the measurement signal comprising at least a first carrier signal at a first carrier frequency, a second carrier signal at a second carrier frequency and a third carrier signal at a third carrier frequency, wherein transmission phase information on the carrier signals are known or derivable;
  a frequency analyzer for analyzing the reception signal to acquire reception phase information on the first carrier signal, the second carrier signal and the third carrier signal; and
  a processor
    for forming a first combined piece of phase information from the reception phase information from a first pair of carrier signals and for forming a second combined piece of phase information from the reception phase information from a second pair of carrier signals, the second pair of carrier signals differing from the first pair of carrier signals,
    for forming a first piece of group delay information from the first combined piece of phase information and the transmission phase information relating to the first pair of carrier signals and for forming a second piece of group delay information from the second combined piece of phase information and the transmission phase information relating to the second pair of carrier signals, and
    for associating the first piece of group delay information to a first frequency and the second piece of group delay information to a second frequency, the first frequency being derived from frequencies of the first pair of carrier signals, and the second frequency being derived from frequencies of the second pair of carrier signals,
  wherein the transmission medium is a coaxial infrastructure in which a bandwidth of the reception signal is between 50 MHz and 500 MHz, in which a measurement region of the coaxial infrastructure starts at a frequency of greater than or equaling 1000 MHz and ends at a frequency of smaller than or equaling 5000 MHz, and wherein a length of the coaxial infrastructure is greater than 50 m,
  or
  wherein the transmission phase information for one carrier signal of the first carrier signal, the second carrier signal and the third carrier signal comprise a phase of + or −90 degrees and, for another carrier signal of the first carrier signal, the second carrier signal and the third carrier signal, a phase of 0 or 180 degrees, and wherein the processor is configured to use a value of 180 degrees as a phase threshold or a correction threshold,
  or
  wherein the reception signal comprises a number of further carrier signals in addition to the first carrier signal, the second carrier signal and the third carrier signal, which are spaced in frequency over a carrier signal spacing, the number being at least 30, and wherein the frequency analyzer is configured to calculate a phase value for each carrier signal as a piece of reception phase information,
  or
  wherein the transmission phase information comprise a first transmission difference between the second carrier signal and the first carrier signal and a second transmission difference between the second carrier signal and the third carrier signal, wherein the frequency analyzer is configured to acquire a first reception phase value for the first carrier signal, a second reception phase value for the second carrier signal and a third reception phase value for the third carrier signal, wherein the processor is configured to calculate a reception difference from the first reception phase value and the second reception phase value as the first combined piece of phase information, and to calculate a second reception difference from the second reception phase value and the third reception phase value as the second combined piece of phase information, wherein the processor is configured to calculate the first piece of group delay information from the first reception difference and the first transmission difference, and to calculate the second piece of group delay information from the second reception difference and the second transmission difference, and wherein the processor is configured to calculate an uncorrected first reception difference from the first reception phase value and the second reception phase value, and to calculate an uncorrected first transmission difference from a first transmission phase value for the first carrier signal and a second transmission phase value for the second carrier signal, and to perform a phase correction in case the uncorrected first reception difference or the uncorrected first transmission difference is greater than a correction threshold,
  or
  wherein the receiver is configured to convert a first frequency section to a base band using a first local oscillator frequency, and to convert a second frequency section to the base band using a second local oscillator frequency, wherein the receiver is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region, and wherein the receiver is configured to perform a single-sideband demodulation using the first local oscillator frequency and the second local oscillator frequency, wherein the first frequency section is arranged in frequency below the first local oscillator frequency, wherein the second frequency section is arranged in frequency below the second local oscillator frequency, and wherein the receiver is configured to convert a third frequency portion to the base band using a third local oscillator frequency, wherein the third frequency portion is arranged above the third local oscillator frequency, the third local oscillator frequency being higher than the first local oscillator frequency or smaller than the second local oscillator frequency, the second frequency portion and the third frequency portion overlapping with each other, or wherein the receiver is configured to convert a first frequency section to a base band using a first local oscillator frequency, and to convert a second frequency section to the base band using a second local oscillator frequency, wherein the receiver is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region, wherein the processor is configured to modify group delay information outside the overlap region for the first frequency portion or the second frequency portion using the group delay information for the different local oscillator frequencies in the overlap region to reduce or eliminate discontinuities due to different local oscillator frequencies, and wherein the processor is configured to calculate a first mean value from group delay information of the first frequency portion in the overlap region to form a second mean value from group delay information of the second frequency portion in the overlap region, to calculate a correction value using the first mean value and the second mean value, and to combine the correction value with the group delay information of the first frequency portion or the second frequency portion to acquire corrected group delay information as the first or the second piece of group delay information.

2. The apparatus in accordance with claim 1, wherein the transmission phase information comprise a first transmission difference between the second carrier signal and the first carrier signal and a second transmission difference between the second carrier signal and the third carrier signal, wherein the frequency analyzer is configured to acquire a first reception phase value for the first carrier signal, a second reception phase value for the second carrier signal and a third reception phase value for the third carrier signal, wherein the processor is configured to calculate a reception difference from the first reception phase value and the second reception phase value as the first combined piece of phase information, and to calculate a second reception difference from the second reception phase value and the third reception phase value as the second combined piece of phase information, and wherein the processor is configured to calculate the first piece of group delay information from the first reception difference and the first transmission difference, and to calculate the second piece of group delay information from the second reception difference and the second transmission difference.

3. The apparatus in accordance with claim 2, wherein the processor is configured to calculate the piece of group delay information from a difference between the first reception difference and the first transmission difference, and to calculate the second piece of group delay information from a difference between the second reception difference and the second transmission difference.

4. The apparatus in accordance with claim 2, wherein the processor is configured to calculate a first transmission-reception difference from the first reception difference and the first transmission difference, and to calculate a second transmission-reception difference from the second reception difference and the second transmission difference, to perform phase correction of the first transmission-reception difference and the second transmission-reception difference in case a difference between the second transmission-reception difference and the first transmission/reception difference is greater than a phase threshold, and to calculate the first piece of group delay information from a first phase-corrected transmission- reception difference, and to calculate the second piece of group delay information from a second phase-corrected transmission-reception difference.

5. The apparatus in accordance with claim 1, wherein the receiver is configured to determine the transmission phase information by receiving side information on the transmission phase information or by estimating from the reception phase information using knowledge on allowed values of the transmission phase information when feeding the measurement signal to the transmission medium.

6. The apparatus in accordance with claim 1, wherein the receiver is configured to acquire one or more further measurement signals temporally after the measurement signal, wherein the frequency analyzer is configured to analyze the one or more further measurement signals, and wherein the processor is configured to determine the group delay information also for the one or the further measurement signals, wherein the processor is additionally configured to determine the group delay information for the carrier frequencies from the group delay information for the measurement signal and the one or more further measurement signals by selecting or combing individual pieces of group delay information per carrier signal.

7. The apparatus in accordance with claim 1, wherein the first carrier signal, the second carrier signal and the third carrier signal are sinusoidal and the frequency analyzer is configured to perform a Fourier analysis of the reception signal.

8. The apparatus in accordance with claim 1, wherein the receiver is configured to convert a first frequency section to a base band using a first local oscillator frequency, to convert a second frequency section to the base band using a second local oscillator frequency, wherein the receiver is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region.

9. The apparatus in accordance with claim 1,
wherein the frequency analyzer is configured to determine respective reception amplitude information for the carrier signals, and wherein the processor is configured to determine an attenuation value per carrier frequency using the reception amplitude information.

10. The apparatus in accordance with claim 8,
wherein the processor is configured to modify group delay information outside the overlap region for the first frequency portion or the second frequency portion using the group delay information for the different local oscillator frequencies in the overlap region to reduce or eliminate discontinuities due to different local oscillator frequencies.

11. The apparatus in accordance with claim 10, wherein the processor is configured to eliminate outliers before forming the first mean value or the second mean value.

12. The apparatus in accordance with claim 11, wherein the process is configured to calculate the outliers using a cumulative distribution function and a maximum quantile value and a minimum quantile value.

13. The apparatus in accordance with claim 1,
wherein the receiver comprises an analog-to-digital converter and a reception memory, wherein additionally a time controller is provided, the time controller being configured to control the reception memory or the analog-to-digital converter such that a digital measurement signal is stored in a temporally ordered manner from a starting point in time to an end point in time, wherein the frequency analyzer is configured to access the reception memory to perform a frequency analysis using the temporally ordered reception signal.

14. The apparatus in accordance with claim 1,
wherein the processor is configured to calculate group delay information for a third frequency portion, which overlaps with the second frequency portion in a further overlap region, the processor being configured to use, for calculating a correction value for the third frequency portion, a correction value from the overlap region between the first frequency portion and the second frequency portion, apart from mean values in the further overlap region.

15. The apparatus in accordance with claim 1,
wherein the processor is configured to determine control information for a transmitter for useful information over the transmission medium using the group delay information, to acquire a desired transfer rate and/or a desired error rate and/or a pre-distortion when transmitting the useful information via the transmission medium.

16. A method for detecting group delay information over frequency for a transmission medium, comprising:
receiving a measurement signal to provide a reception signal, the measurement signal comprising at least a first carrier signal at a first carrier frequency, a second carrier signal at a second carrier frequency and a third carrier signal at a third carrier frequency, wherein transmission phase information on the carrier signals are known or derivable;
analyzing the reception signal to acquire reception phase information on the first carrier signal, the second carrier signal and the third carrier signal;
forming a first combined piece of phase information from the reception phase information from a first pair of carrier signals and forming a second combined piece of phase information from the reception phase information from a second pair of carrier signals, the second pair of carrier signals differing from the first pair of carrier signals,
forming a first piece of group delay information from the first combined piece of phase information and the transmission phase information relating to the first pair of carrier signals and forming a second piece of group delay information from the second combined piece of phase information and the transmission phase information relating to the second pair of carrier signals, and
associating the first piece of group delay information to a first frequency and the second piece of group delay information to a second frequency, the first frequency being derived from frequencies of the first pair of carrier signals, and the second frequency being derived from frequencies of the second pair of carrier signals,
wherein the transmission medium is a coaxial infrastructure in which a bandwidth of the reception signal is between 50 MHz and 500 MHz, in which a measurement region of the coaxial infrastructure starts at a frequency of greater than or equaling 1000 MHz and ends at a frequency of smaller than or equaling 5000 MHz, and wherein a length of the coaxial infrastructure is greater than 50 m,
or
wherein the transmission phase information for one carrier signal of the first carrier signal, the second carrier signal and the third carrier signal comprise a phase of + or −90 degrees and, for another carrier signal of the first carrier signal, the second carrier signal and the third carrier signal, a phase of 0 or 180 degrees, and wherein the forming comprises using a value of 180 degrees as a phase threshold or a correction threshold,
or
wherein the reception signal comprises a number of further carrier signals in addition to the first carrier signal, the second carrier signal and the third carrier signal, which are spaced in frequency over a carrier signal spacing, the number being at least 30, and wherein the analyzing comprises calculating a phase value for each carrier signal as a piece of reception phase information,
or
wherein the transmission phase information comprise a first transmission difference between the second carrier signal and the first carrier signal and a second transmission difference between the second carrier signal and the third carrier signal, wherein the analyzing comprises acquiring a first reception phase value for the first carrier signal, a second reception phase value for the second carrier signal and a third reception phase value for the third carrier signal, wherein the forming comprises calculating a reception difference from the first reception phase value and the second reception phase value as the first combined piece of phase information, calculating a second reception difference from the second reception phase value and the third reception phase value as the second combined piece of phase information, calculating the first piece of group delay information from the first reception difference and the first transmission difference, calculating the second piece of group delay information from the second reception difference and the second transmission difference, calculating an uncorrected first reception difference from the first reception phase value and the second reception phase value, calculating an uncorrected first transmission difference from a first transmission phase value for the first carrier signal and a second transmission phase value for the second carrier signal, and performing a phase correction in case the uncorrected first reception difference or the uncorrected first transmission difference is greater than a correction threshold, or wherein the receiving comprises converting a first frequency section to a base band using a first local oscillator frequency, and converting a second frequency section to the base band using a second local oscillator frequency, wherein the receiving is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region, and wherein the receiving comprises performing a single-sideband demodulation using the first local oscillator frequency and the second local oscillator frequency, wherein the first frequency section is arranged in frequency below the first local oscillator frequency, wherein the second frequency section is arranged in frequency below the second local oscillator frequency, and wherein the receiving comprises converting a third frequency portion to the base band using a third local oscillator frequency, wherein the third frequency portion is arranged above the third local oscillator frequency, the third local oscillator frequency being higher than the first local oscillator frequency or smaller than the second local oscillator frequency, the second frequency portion and the third frequency portion overlapping with each other, or wherein the receiving comprises converting a first frequency section to a base band using a first local oscillator frequency, and converting a second frequency section to the base band using a second local oscillator frequency, wherein the receiving is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region, wherein the forming comprises modifying group delay information outside the overlap region for the first frequency portion or the second frequency portion using the group delay information for the different local oscillator frequencies in the overlap region to reduce or eliminate discontinuities due to different local oscillator frequencies, calculating a first mean value from group delay information of the first frequency portion in the overlap region to form a second mean value from group delay information of the second frequency portion in the overlap region, calculating a correction value using the first mean value and the second mean value, and combining the correction value with the group delay information of the first frequency portion or the second frequency portion to acquire a corrected group delay information as the first or the second piece of group delay information.

17. A non-transitory digital storage medium having stored thereon a computer program for performing, when said computer program is run by a computer, a method for detecting group delay information over frequency for a transmission medium, the method comprising:

receiving a measurement signal to provide a reception signal, the measurement signal comprising at least a first carrier signal at a first carrier frequency, a second carrier signal at a second carrier frequency and a third carrier signal at a third carrier frequency, wherein transmission phase information on the carrier signals are known or derivable;

analyzing the reception signal to acquire reception phase information on the first carrier signal, the second carrier signal and the third carrier signal;

forming a first combined piece of phase information from the reception phase information from a first pair of carrier signals and forming a second combined piece of phase information from the reception phase information from a second pair of carrier signals, the second pair of carrier signals differing from the first pair of carrier signals, forming a first piece of group delay information from the first combined piece of phase information and the transmission phase information relating to the first pair of carrier signals and forming a second piece of group delay information from the second combined piece of phase information and the transmission phase information relating to the second pair of carrier signals, and associating the first piece of group delay information to a first frequency and the second piece of group delay information to a second frequency, the first frequency being derived from frequencies of the first pair of carrier signals, and the second frequency being derived from frequencies of the second pair of carrier signals wherein the transmission medium is a coaxial infrastructure in which a bandwidth of the reception signal is between 50 MHz and 500 MHz, in which a measurement region of the coaxial infrastructure starts at a frequency of greater than or equaling 1000 MHz and ends at a frequency of smaller than or equaling 5000 MHz, and wherein a length of the coaxial infrastructure is greater than 50 m, or wherein the transmission phase information for one carrier signal of the first carrier signal, the second carrier signal and the third carrier signal comprise a phase of + or −90 degrees and, for another carrier signal of the first carrier signal, the second carrier signal and the third carrier signal, a phase of 0 or 180 degrees, and wherein the forming comprises using a value of 180 degrees as a phase threshold or a correction threshold, or wherein the reception signal comprises a number of further carrier signals in addition to the first carrier signal, the second carrier signal and the third carrier signal, which are spaced in frequency over a carrier signal spacing, the number being at least 30, and wherein the analyzing comprises calculating a phase value for each carrier signal as a piece of reception phase information, or wherein the transmission phase information comprise a first transmission difference between the second carrier signal and the first carrier signal and a second transmission difference between the second carrier signal and the third carrier signal, wherein the analyzing comprises acquiring a first reception phase value for the first carrier signal, a second reception phase value for the second carrier signal and a third reception phase value for the third carrier signal, wherein the forming comprises calculating a reception difference from the first reception phase value and the second reception phase value as the first combined piece of phase information, calculating a second reception difference from the second reception phase value and the third reception phase value as the second combined piece of phase information, calculating the first piece of group delay information from the first reception difference and the first transmission difference, calculating the second piece of group delay information from the second reception difference and the second transmission difference, calculating an uncorrected first reception difference from the first reception phase value and the second reception phase value, calculating an uncorrected first transmission difference from a first transmission phase value for the first carrier signal and a second transmission phase value for the second carrier signal, and performing a phase correction in case the uncorrected first reception difference or the uncorrected first transmission difference is greater than a correction threshold, or wherein the receiving comprises converting a first frequency section to a base band using a first local oscillator frequency, and converting a second frequency section to the base band using a second local oscillator frequency, wherein the receiving is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region, and wherein the receiving comprises performing a single-sideband demodulation using the first local oscillator frequency and the second local oscillator frequency, wherein the first frequency section is arranged in frequency below the first local oscillator frequency, wherein the second frequency section is arranged in frequency below the second local oscillator frequency, and wherein the receiving comprises converting a third frequency portion to the base band using a third local oscillator frequency, wherein the third frequency portion is arranged above the third local oscillator frequency, the third local oscillator frequency being higher than the first local oscillator frequency or smaller than the second local oscillator frequency, the second frequency portion and the third frequency portion overlapping with each other, or wherein the receiving comprises converting a first frequency section to a base band using a first local oscillator frequency, and converting a second frequency section to the base band using a second local oscillator frequency, wherein the receiving is controlled to set the first local oscillator frequency and the second local oscillator frequency to be temporally offset using a fixed schedule or a schedule received via a side channel, and wherein the first local oscillator frequency and the second local oscillator frequency are set such that the first frequency section and the second frequency section overlap in an overlap region so that several pieces of group delay information each are acquired from measurements with different local oscillator frequencies for carrier frequencies in the overlap region, wherein the forming comprises modifying group delay information outside the overlap region for the first frequency portion or the second frequency portion using the group delay information for the different local oscillator frequencies in the overlap region to reduce or eliminate discontinuities due to different local oscillator frequencies, calculating a first mean value from group delay information of the first frequency portion in the overlap region to form a second mean value from group delay information of the second frequency portion in the overlap region, calculating a correction value using the first mean value and the second mean value, and combining the correction value with the group delay information of the first frequency portion or the second frequency portion to acquire a corrected group delay information as the first or the second piece of group delay information.

* * * * *